US011935429B2

(12) United States Patent
Van Dinther

(10) Patent No.: US 11,935,429 B2
(45) Date of Patent: Mar. 19, 2024

(54) ENDOSCOPE SIMULATOR

(71) Applicant: Airway Limited, Auckland (NZ)

(72) Inventor: Paul Van Dinther, Auckland (NZ)

(73) Assignee: Airway Limited, Auckland (NZ)

(*) Notice: Subject to any disclaimer, the term of this patent is extended or adjusted under 35 U.S.C. 154(b) by 499 days.

(21) Appl. No.: 17/020,709

(22) Filed: Sep. 14, 2020

(65) Prior Publication Data

US 2020/0410900 A1      Dec. 31, 2020

Related U.S. Application Data

(63) Continuation of application No. 15/408,025, filed on Jan. 17, 2017, now abandoned, which is a continuation of application No. 13/391,607, filed as application No. PCT/NZ2010/000161 on Aug. 18, 2010, now Pat. No. 9,711,066.

(30) Foreign Application Priority Data

Aug. 18, 2009 (NZ) ........................................ 579175

(51) Int. Cl.
 G09B 9/00 (2006.01)
 G09B 23/28 (2006.01)
 G09B 23/30 (2006.01)
 G06F 3/01 (2006.01)

(52) U.S. Cl.
 CPC ............. *G09B 23/285* (2013.01); *G09B 9/00* (2013.01); *G09B 23/30* (2013.01); *G06F 3/016* (2013.01)

(58) Field of Classification Search
 CPC ........ G09B 23/285; G09B 9/00; G09B 23/30; G06F 3/016
 See application file for complete search history.

(56) References Cited

U.S. PATENT DOCUMENTS

| 4,907,973 A | 3/1990 | Hon |
| 5,403,191 A | 4/1995 | Tuason |
| 5,704,791 A | 1/1998 | Gillio |
| 5,755,577 A | 5/1998 | Gillio |
| 5,791,908 A | 8/1998 | Gillio |
| 5,800,177 A | 9/1998 | Gillio |

(Continued)

FOREIGN PATENT DOCUMENTS

| AU | 671705 | 4/1994 |
| EP | 1722346 | 12/2012 |

(Continued)

OTHER PUBLICATIONS

Basdogan, Cagatay, et al. "Virtual Environments for Medical Training: Graphical and Haptic Simulation of Laparoscopic Common Bile Duct Exploration," IEEE/ASME Transactions on Mechatronics, vol. 6, No. 3, pp. 269-285 (2001).

(Continued)

*Primary Examiner* — Jay Hann
(74) *Attorney, Agent, or Firm* — Lowe Graham Jones PLLC

(57) ABSTRACT

A method of determining a position of an object in a virtual environment and for assessing a performance in the movement of said object. Preferred embodiments provide an improved endoscope simulator and means for assessing performance in the use of an endoscope.

17 Claims, 13 Drawing Sheets

(56) References Cited

U.S. PATENT DOCUMENTS

| | | | |
|---|---|---|---|
| 5,800,178 A * | 9/1998 | Gillio | G09B 23/285 434/323 |
| 5,821,920 A | 10/1998 | Alarcon et al. | |
| 5,882,206 A | 3/1999 | Gillio | |
| 6,106,301 A | 8/2000 | Merril | |
| 6,470,302 B1 | 10/2002 | Cunningham et al. | |
| 6,610,007 B2 | 8/2003 | Belson et al. | |
| 6,654,000 B2 | 11/2003 | Rosenberg | |
| 6,929,481 B1 | 8/2005 | Alexander et al. | |
| 7,215,326 B2 | 5/2007 | Rosenberg | |
| 7,289,106 B2 | 10/2007 | Bailey et al. | |
| 7,308,831 B2 | 12/2007 | Cunningham et al. | |
| 7,678,117 B2 | 3/2010 | Hinman et al. | |
| 7,931,470 B2 * | 4/2011 | Alexander | G09B 23/285 434/262 |
| 8,417,491 B2 | 4/2013 | Trovato et al. | |
| 2002/0133057 A1 | 9/2002 | Kukuk | |
| 2006/0211917 A1 | 9/2006 | Ikemoto et al. | |
| 2006/0257835 A1 | 11/2006 | Wallaker et al. | |
| 2007/0134637 A1 | 6/2007 | Bronstein et al. | |
| 2010/0063788 A1 | 3/2010 | Brown et al. | |
| 2011/0014596 A1 | 1/2011 | Kurenov et al. | |

FOREIGN PATENT DOCUMENTS

| | | |
|---|---|---|
| GB | 2252656 | 12/1992 |
| KR | 3085683 | 11/2003 |
| KR | 6030594 | 4/2006 |
| WO | 9111775 | 8/1991 |
| WO | 9401042 | 1/1994 |
| WO | 9622591 | 7/1996 |
| WO | 9630885 | 10/1996 |
| WO | 9719440 | 5/1997 |
| WO | 9806024 | 2/1998 |
| WO | 9810387 | 3/1998 |
| WO | 9826342 | 6/1998 |
| WO | 9832090 | 7/1998 |
| WO | 9939273 | 8/1999 |
| WO | 9939315 | 8/1999 |
| WO | 9939317 | 8/1999 |
| WO | 9949443 | 9/1999 |
| WO | 0154109 | 7/2001 |
| WO | 0188881 | 11/2001 |
| WO | 2001088882 | 11/2001 |
| WO | 0243030 | 5/2002 |
| WO | 0309069 | 1/2003 |
| WO | 0321553 | 3/2003 |
| WO | 0323736 | 3/2003 |
| WO | 0330128 | 4/2003 |
| WO | 0350783 | 6/2003 |
| WO | 03058583 | 7/2003 |
| WO | 0415657 | 2/2004 |
| WO | 0446873 | 6/2004 |
| WO | 0559866 | 6/2005 |
| WO | 2007027101 | 3/2007 |
| WO | 2009008750 | 1/2009 |

OTHER PUBLICATIONS

Ferlitsch, A., et al., "Objective Assessment of Laparoscopic Skills Using a Virtual Reality Simulator Training in Gastrointestinal Endoscopy," Endoscopy, vol. 34, pp. 698-702 (2002).

Geiger et al, "Simulation of Endoscopy" Joint conference, Computer vision, virtual medical robotics and computer assisted surgery proceedings, Apr. 3, 1995 (Apr. 3, 1995), pp. 277-281 XP001036505.

Stephane Cotin et al, "Metrics for laparoscopic skills trainers: the weakest link!" in Medical image computing and computer assisted intervention—MICCAI 2002 Jan. 1, 2002 (Jan. 1, 2002) Springer Berlin Heidelberg, Berlin, Heidelberg, XP055133982 ISBN: 978-3-54-044224-0 vol. 2488 pp. 35-43.

* cited by examiner

ENDOSCOPE SIMULATOR

PRIORITY CLAIM

This application is a continuation of U.S. patent application Ser. No. 15/408,025 filed Jan. 17, 2017; which is a continuation of U.S. patent application Ser. No. 13/391,607 filed Aug. 6, 2012; which is a U.S. National Phase of International Patent Application No. PCT/NZ2010/000161 filed Aug. 18, 2010; which claims priority from New Zealand Application No. 579175 filed Aug. 18, 2009, which applications are incorporated herein by reference in their entireties.

FIELD OF THE INVENTION

The present invention relates to an endoscope simulator. More particularly, the invention relates to a training aid which simulates movement of a virtual endoscope in a virtual human or animal body passageway or cavity, and which preferably provides for improved realism and/or accuracy in the simulated path in the virtual space.

BACKGROUND OF THE INVENTION

Endoscopy is a minimally invasive diagnostic medical procedure used to view interior parts of the body, such as the interior or exterior surfaces of organs, joints or cavities. It enables physicians to peer through the body's passageways. An endoscope typically uses two fibre optic lines. The first, a "light fibre", carries light to the region of the body to be viewed. The second, an "image fibre", carries the image of the region back to the physician's viewing lens or, where desired, to a camera so that the image may be displayed on a screen. The portion of the endoscope inserted into the body may be sheathed in a rigid or flexible tube, depending upon the medical procedure. One or more lenses may be provided at the end of the endoscope to enhance image capture and/or illumination of the body region. Ports may be provided to for administering drugs, suction, irrigation, and introducing small instruments.

For applications such as bronchoscopy, the tube must be sufficiently flexible to allow it to be accommodated in body passageways without undue discomfort or injury to patients under examination, but must be rigid enough to cause it to move through passageways without bunching up. Physicians operate an endoscope by controlling how far the tube is inserted and by rotation of the tube. The tips of endoscopes may be selectively bendable in at least one direction so that the tip may be pointed in a desired direction. Through control of the bend of the tip and rotation of the endoscope tube, the tip of the endoscope may pass through bends in the interior passageways without the tip directly impinging on the walls. This also facilitates the desired path to be selected at a junction, e.g. where the trachea meets the left and right bronchi.

A physician may practice procedures on a patient but this is not desired, at least during early stages of training as inexperienced operators may injure a patient or damage the equipment (endoscope tips are fragile, complex and expensive to replace).

Physical models of passageways or "airway mannequins" may be used in place of patients but these suffer from difficulty in accurately mimicking the contour and surface characteristics of the passageways. It is generally necessary to use genuine endoscopes with mannequins and so they do not prevent the tips of endoscopes being damaged and the associated cost. Also, they remove endoscopes from clinical use and raise sterility concerns. The mannequins themselves are expensive and limited in that each mannequin is modelled on a particular type of patient (e.g. paediatric versus adult). Thus, it is necessary to obtain a variety of mannequins or for physicians to practice in an environment which differs from that of a patient to be operated on.

To overcome these problems, simulators have been created which avoid the use of an actual endoscope. GB-A-2,252,656, for example, discloses a dummy endoscope including an insertion tube which is received within a duct in a fixture having mechanical sensing means for detecting longitudinal and rotational movement of the tube relative to the fixture. A simulated image of an endoscopic procedure, responsive to outputs of the sensing means and actuation of the endoscope controls, is displayed on a monitor. The fixture is provided with tactile means which provide variable tactile feedback to the user of the endoscope in accordance with the outputs of a mathematical model of the endoscope and an organ.

Simulators such as that disclosed in GB-A-2,252,656 rely on creating a computer model of the relevant internal environment and modelling the motion of the endoscope therethrough using path-seeking algorithms. Path-seeking algorithms attempt to mathematically project a path forward through the simulated environment by breaking it down into a predetermined resolution, with grains either including a portion of the wall of the passageway or not. Movement from one grain to the next is limited by only allowing movement into an adjacent grain which does not include a portion of the wall of the passageway. This provides a poor model of the interaction between the simulated tip of an endoscope and the walls of the passageway.

As a further example, WO-A-96/30885 discloses a surgical procedure simulator using a "physical constraining model". The constraints of the physical constraining model are "constructed to be approximately the same size as the virtual computer model corresponding to image data stored in the memory of the computer." The physical constraining model is described as an inexpensive way of providing tactile feedback without requiring edge or collision detection software programs to determine when the mouse device meets or collides with an edge/wall in the image data.

As an alternative to the physical constraining model, the above document also discloses the use of "virtual models" implementing known edge collision and detection software such as High Techsplantations' Telios.

Prior attempts at simulating the passage of an endoscope have suffered from inherent inaccuracies and/or have high processing requirements (e.g. WO 2009/008750), causing difficulties in simulating motion in real time and/or preventing use of such arrangements with conventional PCs.

SUMMARY OF THE INVENTION

It is an object to provide a system and/or method and/or apparatus which at least mitigates one/more problems of prior art endoscope simulators or to at least provide a useful choice.

According to a first aspect, there is provided a method of determining a position and/or orientation of an object in a virtual environment, the method including:
  representing the object as a plurality of segments;
  receiving input signals, said input signals based at least in part on commands of a user indicative of a desired motion of the object; and determining a movement of said object in the virtual environment in response to the input signals, said determining including:
  determining a movement of at least a subset of the segments in response to the input signals;
  detecting whether any of the segments of the subset impact a wall of the virtual environment; and
  if so, determining a direction of motion of a said segment following the impact by combining data representing each wall being impacted and resolving to determine an escape direction for the segment.

While not limited thereto, further characterisation of the invention will be made with reference to the preferred implementation as an endoscope simulator.

The input signals may represent insertion or removal of an endoscope and/or rotation about the major axis thereof. Input signals may also be used to represent bending of a tip of an endoscope as well as actuation of any additional equipment that may be used with an endoscope.

The input signals may be received from a user via conventional user input means, such as a joystick, keypad or mouse. However, according to preferred embodiments, a mock endoscope arrangement is used, wherein movement of a tube by a user is sensed and used to generate the input signals.

Data defining the virtual environment may be stored locally or remotely.

Preferably, determining a motion includes determining an angle of motion before and/or after a collision of the simulated endoscope and a virtual wall.

Preferably, the segments are substantially rigid and coupled to one another end on end, forming a tip. The couplings are preferably pivotable couplings.

Preferably, the segments are adjustably but fixably coupled at or proximate to the tip so that these mimic the endoscope tip by being bendable in response to user input but otherwise substantially rigid. Other segments have non-fixed couplings whereby they may freely pivot. The amount of flexibility may be limited by limiting the maximum angle of bend between two segments i.e., the extent to which tip segments may depart from the user defined position.

Preferably, movement of the object is translated into the addition or subtraction of one or more segments at the tip, the number and/or length of said one or more segments corresponding to the distance moved.

Preferably, the step of determining whether a segment impacts a wall of the virtual environment includes determining whether a segment at or proximate the tip impinges a wall. Preferably, this is followed by one or more additional segments, from the tip backwards, being checked to see whether they impact a wall.

Following the detection of a collision and the determination of the escape direction, preferably, a small correction is applied to the angle between the colliding segment and one or more segments prior to that. Preferably, the correction is incrementally reduced for each coupling between segments away from the collision.

Following or during application of the corrections, the step of determining whether there is a collision is preferably repeated, with the corrections adjusted if there is. Further iterations of this process are preferably performed.

Preferably, the method includes applying a smoothing or straightening function to the object.

In the event that there is no escape direction, preferably, the method includes providing one or more segments with an amount of "give". While this may involve increasing the maximum bend angle away from the tip, it is preferably achieved by providing segments simulating the actuable bendable tip with a small degree of angular freedom such that they move to resolve the "jammed" endoscope.

According to a second aspect, there is provided a method of simulating the path of an endoscope in a human or animal passageway or cavity to assess the performance of a user manipulating an object in a virtual environment, the object having one or more preferred paths through the virtual environment, including:
  positioning at least first and second goals in the environment, the goals each being defined by a space within the environment and configured to be activated when the object enters said spaces;
  establishing one or more sequences in which to complete the goals;
  monitoring the position and/or orientation of at least a portion of the object within the environment to determine a user's path; and
  comparing the user's path to the one or more preferred paths.

Preferably, the preferred path is established by an expert user (e.g. a medical practitioner competent in endoscopic use) guiding the object through the environment.

Preferably, the goals are positioned to provide one or more path segments, wherein the step of comparing is performed for each path segment.

Preferably, the one or more sequences are established by arranging the segments into the form of a decision tree.

Preferably, the comparing is performed to obtain a measure of variance of the user's path from the preferred path.

Positive scores may be awarded for reaching a desired goal and negative scores for incorrectly entering an area (e.g. an area representing a tumour).

Preferably, the method according to this aspect of invention is provided with a haptic means wherein the haptic means may be modified to provide the desired force feedback to the user.

According to a third aspect, there is provided an engine for determining a position and/or orientation of an object in a virtual environment and/or for assessing the performance of a user manipulating the object in the virtual environment, the engine having hardware and/or software encoded instructions for performing the method of the first and/or second aspects of the invention.

According to a fourth aspect, there is provided a system for simulating the path of an endoscope in a human or animal passageway or cavity and/or for assessing the performance of a user manipulating an object in a virtual environment, including:
  the engine of the third aspect; and
  a memory having stored therein data defining the virtual environment.

According to preferred embodiments where a mock endoscope is used, the system includes a tube and sensing means for sensing movement of the tube, wherein the engine or a processor is configured to translate movement of the tube detected by the sensing means into movement inside the virtual environment.

Preferably, the data defining the virtual environment is generated using three-dimensional modelling software and at least defines the inner walls thereof.

Preferably, the system includes a display to display images of the virtual environment.

Preferably, the engine is configured to generate the images based on a combination of the data defining the virtual environment and the determined movement such that the images change at least partly dependent on movement of the object. More particularly, the images preferably vary to mimic the changes in view that would be seen in a real endoscope procedure, including during simulated bending of the tip of an endoscope.

Algorithms for translating the determined position and/or orientation of the object in the virtual environment into a corresponding view in a virtual environment are known.

Preferably, the images are updated in response to user inputs substantially in real-time.

Preferably, the display is configured to display the images in a stream.

According to one embodiment, additional actuators are provided to control other simulated features of an endoscope, such as a switch for actuating a simulated suction tube to remove undesired fluids. Other actuators may be provided such as for simulating the supply of oxygen or drugs, the insertion of fine instruments, the control of focus and activation of a camera, all in a similar fashion to those in real life.

Preferably, a memory stores the images as they are created to enable them to be viewed again. Alternatively, the simulated path and/or the inputs of a user and/or a record of the position of the endoscope may be stored so that the images may be regenerated at a subsequent time. The position may be an absolute position, relative to points in the simulated environment or relative to a preferred path of the endoscope. Furthermore, while it is possible to merely consider the position of the tip, the positions of one or more additional nodes along the endoscope tube may also be considered.

Preferably, the system includes means for determining parameters associated with movement of the endoscope in the simulated passageway or cavity. These may include a speed of movement, a speed immediately prior to a collision, a length of time to insert and/or remove the tube, information generated by the engine regarding collisions, etc. These parameters may be used to measure the competency of operation by a user. Other parameters for measuring competency will be apparent to those in the art and such alternatives are within the scope of the invention. A preferred form of assessment is set out in the second aspect.

Preferably, the memory is configured to store any such additional parameters and the display may be configured to display them.

While not provided for preferred embodiments so as to provide a relatively low cost and simple training aid, force feedback generator(s) may be used to generate and/or restrict movement of a controller used to move the object.

According to embodiments using the mock endoscope set up described herein, the force feedback generator(s) may include motor means and/or braking means for limiting and/or reversing movement of the tube, such as in the event of a collision.

According to one embodiment, the force feedback generator(s) is provided at the handset. According to another embodiment, the force feedback generator(s) is alternatively or additionally provided proximate the aperture and/or inside the housing to more closely mimic feedback created when performing the procedure on a patient.

As would be apparent to one of skill in the art, the processor, memory and display may be components of a conventional computer. Also, information generated by embodiments of the invention may be communicated to other computing devices as desired to enable a user's performance results and/or stream of images to be viewed by others. The internet provides one such gateway for data communication but any known communication means is included within the scope of the invention.

According to a fifth aspect, there is provided an apparatus for use in determining a position and/or orientation of an object in a virtual environment for simulating the path of an endoscope in a human or animal passageway or cavity, the apparatus comprising or including:
a handset;
a tube coupleable to or slideably engageable with the handset;
sensor(s) for detecting movement of the tube; and
a memory for storing and/or a transmitter for transmitting data relating to the detected movement.

Preferably, the apparatus includes an aperture for receiving the tube.

Preferably, the sensor(s) is provided proximate to the aperture and may be configured to detect translational movement of the tube through the aperture and/or rotational movement of the tube inside the aperture.

Preferably, the handset includes an actuator, whereby actuation of the actuator causes control signals to be generated.

Preferably, the apparatus is provided with a haptic means wherein the haptic means may be modified to provide the desired force feedback to the user.

According to a further embodiment, there is provided an engine having encoded instructions for:
determining a position and/or orientation of an object in a virtual environment;
representing the object as a plurality of segments;
receiving input signals, said input signals based at least in part on commands of a user indicative of a desired motion of the object; and
determining a movement of said object in the virtual environment in response to the input signals, said determining including:
determining a movement of at least a subset of the segments in response to the input signals;
detecting whether any of the segments of the subset impact a wall of the virtual environment; and
if so, determining a direction of motion of a said segment(s) following the impact by combining data representing each wall being impacted and resolving to determine an escape direction for the segment(s),
wherein said movement of the object is translated into the addition or subtraction of one or more segments at a tip thereof, and
assessing the performance of a user manipulating the object in the virtual environment according to a previous aspect of the invention.

Further aspects of the invention, which should be considered in all its novel aspects, will become apparent to those skilled in the art on reading the following description which provides at least one example of a practical application.

BRIEF DESCRIPTION OF THE DRAWINGS

Embodiments of the invention will be described below by way of example only and without intending to be limiting with reference to the following drawings, in which.

DETAILED DESCRIPTION OF THE PREFERRED EMBODIMENT

Embodiments of the invention provide a computer-based and operated simulator which creates a realistic environment for instruction and training in the use of an endoscope. The fully interactive environment simulates the real world behaviour of endoscope insertion and the resultant visual feedback. It may be used by those lacking experience of endoscopic procedures and by skilled physicians wishing to re-familiarise themselves with a procedure, particularly those performed less frequently or more risky. Performance of users may be tracked and assessed.

Existing endoscopy simulators, such as those disclosed in GB-A-2,252,656 and WO-A-96/30885, use a simple mathematical model of the displayed passageway or cavity and a path-seeking or edge detection algorithm to simply identify collisions between the virtual endoscope tube and passageway, whereas the arrangements presented in WO-A-2009/08750 include a physics engine to analyse the basic Newtonian physics of the collision and simulate the interaction and effect upon the endoscope tube which is reflected in the images displayed. The latter solution was found to require excessive computer processing power. The invention provides arrangements similar to those described in WO-A-2009/08750 but with methodology designed to reduce processing requirements. In summary, a model is used which "grows" the simulated tube in a virtual passageway with an algorithm used to work back along the tube from the tip (for at least a predetermined number of segments) so as to account for changes in the orientation of the prior segments as the simulated endoscope is "inserted". To arrive at a realistic solution, this process is preferably iterative, and smoothing is performed. Also, to remedy situations where the simulated endoscope becomes "stuck" or "jammed" in the virtual passageway, the couplings between one or more segments of the simulated endoscope may be provided with "give" i.e., a small amount of flexibility or angular freedom. "Give" could additionally/alternatively be provided in the walls of the virtual passageway.

Preferred embodiments of the invention are relatively cheap, simple and readily portable since bulky, heavy equipment is not required and the invention is able to operate with conventional computing equipment.

Figure 1:
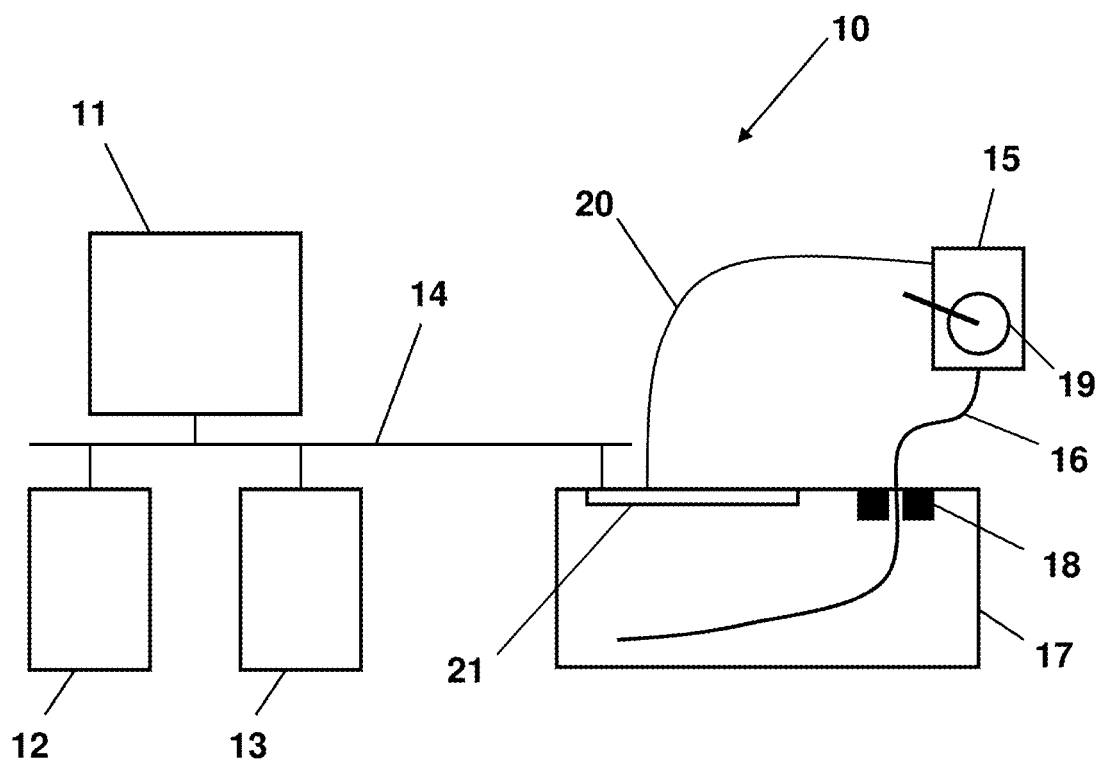
FIG. 1 is a schematic diagram of an embodiment of the invention.

FIG. 1 is a schematic diagram of a system 10, according to one embodiment. System 10 includes display 11, processor 12, memory 13, bus 14, handset 15, tube 16, housing 17, sensor 18, control 19 (as will be appreciated, multiple controls may be provided and positioned as desired), wire 20 and circuit 21.

Display 11, processor 12, memory 13 and bus 14 are preferably embodied by a conventional personal computer but purpose-built devices with more specific functionality are within the scope of the invention. Any display may be used such as monitors, projectors and viewing lenses adapted to provide images therethrough and mimic those used for real endoscopic procedures. While a single display is shown, any number of displays may be used to enable others to view the user's operation. The displayed images are preferably created by processor 12 using information stored in memory 13. Due to the virtual nature of the environment, parameters for additional/alternative environments may be obtained or generated as required, such as via the internet or any computer readable memory. Processor 12 may include or be couplable to a 3D graphics accelerator card to assist in displaying images. Bus 14 enables the transfer of data between display 11, processor 12 and memory 13.

Handset 15 is preferably configured to feel and operate in a similar manner to a genuine handset for an endoscope. Similarly, tube 16 is preferably selected to have structural properties (e.g., flexibility/rigidity, thickness, etc) similar to that of a genuine tube for an endoscope. According to one embodiment, tube 16 is selectively couplable or engageable to handset 15 to enable different tubes to be used for different procedures so as to better mimic the actual equipment used for a particular procedure.

In operation, a user inserts the tip of tube 16 into an opening in housing 17. The opening may be provided with a funnel to guide insertion. Alternatively, the wall of the opening may be configured to imitate an opening into which an endoscope may be inserted (e.g. a mouth/throat). One or more sensors 18 may be provided at the opening to monitor movement of tube 16. Preferably, sensor(s) 18 monitors both rotational and translational movement of tube 16 as it passes through the opening.

Movement sensors have been widely developed and while it is preferred that sensor(s) 18 is a laser-based sensor, the invention is not limited thereto. Where a laser-based sensor is used, it is preferably capable of tracking the tube rotation and displacement at a resolution of 2000 dpi.

Other forms of optical and non-optical sensors may additionally or alternatively be used.

According to an alternative embodiment, two optical cameras are used that are both substantially perpendicular to the opening and one another. This enables not only measurement of rotation and insertion, but also the angle of insertion and the actual position of the endoscope within the hole. This allows larger holes to be used which may better mimic actual orifices such as the mouth.

Tube 16 may be provided with one or more markings to assist in detecting movement thereof (or avoiding undetected movement). For example, lines may be provided along the length of the tube 16 to aid in detecting rotation thereof. Rings may additionally or alternatively be provided around the tube 16 to aid detecting movement along the longitudinal axis. Other forms of marking will also be apparent.

Further, non-visually identifiable means may be used. For example, one or more conductive wires may extend through the tube with sensors provided for detecting changes in the field generated thereby so as to detect movement.

Sensor(s) 18 is coupled to circuit 21 which relays information to processor 12 via bus 14. According to a preferred embodiment, the connection between circuit 21 and processor 12 may be effected using conventional USB connectors, preferably making use of the Microsoft HID device interface standard so as to avoid the need for specialised drivers. Use of a USB connector avoids the need to provide circuit 21 with a dedicated power supply since power may be fed via a USB cable. According to an alternative embodiment, circuit 21 may be coupled to a transmitter for wirelessly communicating data to a receiver coupled to processor 12. Bluetooth or other wireless protocols may be used. Various other communication means will be apparent and are included within the scope of the invention.

As tube 16 is passed through the opening, it is preferably collected in housing 17. Control 19 is used to control the simulated action of the bending of the tip of an endoscope. Preferably, control 19 includes a spring-loaded rotatable lever which is operable in a similar fashion to the lever found on conventional endoscope controls. However, according to preferred embodiments, operation of control 19 does not result in the bending of an actual endoscope tip, it merely causes the appropriate images to be displayed on display 11 by adjusting the viewing angle on the monitor and moving the tip in the virtual space. Control signals from handset 15 are relayed via wire 20 to circuit 21, and then to processor 12, again, in a similar fashion to conventional endoscopes. Again, a wireless connection may alternatively be used. As would be apparent to those in the art, signals from handset 15 and/or sensor(s) 18 may bypass circuit 21, in which case circuit 21 may be modified or removed.

Software stored in memory 13 and executed by processor 12 translates the sensed tube 16 movement into an interactive three dimensional view of the particular simulated passageway or cavity under examination. The images displayed take account of the restricted environment being viewed using an engine which simulates interaction between an endoscope tube and the walls of a passageway or cavity. Embodiments of the invention provide for a realistic path of the simulated endoscope in the virtual space, providing a high level of accuracy in the images displayed.

More specifically, the software includes a first module which models the structure of the passageway (such as the oral/nasal passageway, larynx, trachea, etc) in three dimensions, and a second module which models movement of the simulated endoscope, taking into account the restrictions or effects on movement caused by the constraints of the walls of the virtual space. The first module may be based on any one of a number of widely available programs, such as Autodesk® 3DStudio MAX, Autodesk® Maya, or the open source Blender® (blender.org) or anim8or® (anim8tor.com) software. While particular models vary, they generally rely on breaking down and approximating the environment to be modelled using manageable planar surfaces. According to preferred embodiments, the three dimensional visual system or graphics is preferably based on industry standard OPENGL® which expresses all geometry using small triangles with specially designed texture graphics applied thereto to achieve the desired visual effect. As one alternative to OPENGL®, Direct3D® may be used. Both alternatives are supported by the "Ogre" open source 3D graphics engine.

The second module is also a three dimensional model but of the simulated tube or endoscope and its interaction with the passageway. Full scale physics simulation of a flexible tube as described in WO 2009/008750 is done by a chain of rigid capsules connected end to end. A physics engine then resolves the various forces that are induced by the user and through collisions. This proved to be hard work for even the fastest PC's and produced unwanted side effects (e.g. inertia). It is preferable for the invention to work on medium quality laptops to remove the need for special equipment and enable widespread use. With this in mind, the inventor devised the following logic for simulating a flexible tube such as that used for a flexible fibre optic bronchoscope.

The novel tube simulation engine is based on geometry and as such should not be considered a "physics engine".

Figure 9A:
FIGS. 9a, 9b, and 10 show a single tube segment, and a plurality joined to form straight and bent tubes, respectively.
Figure 9B:
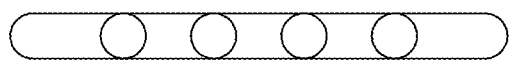
Figure 10:
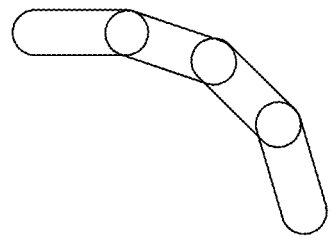

According to preferred embodiments, the bronchoscope tube is simulated by a chain of rigid capsules. A sample capsule is provided in FIG. 9a and a plurality linked together to form a portion of a tube provided in FIG. 9b. The capsules overlap and the hinge points between the capsules (also referred to as segments) are in the centre of the circles formed by the overlapping capsules. An example bent tube is illustrated in FIG. 10. The simulation model allows for adjustment of capsule diameter and capsule length, thus allowing control over resolution and tube diameter.

Figure 11:
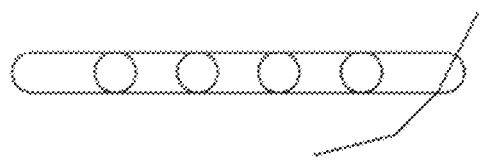
FIG. 11 shows a simulated tube impacting a virtual wall.

A collision takes place when the intended position intersects with the model geometry as shown in FIG. 11. Known edge/collision detection algorithms may be used to detect collisions. According to a presently preferred embodiment, a modified version of OPCODE (see http://www.codercorner.com/Opcode.htm) collision library as applied in the ODE physics engine library (see http://www.ode.org). Note that, preferably, the ODE physics engine is not actually used, only the collision library included with it. An advantage of this collision library is that it organises the hundreds of thousands of triangles in the model using an Octree data structure (whereby partitions within the virtual space are recursively subdivided, see http://en.wikipedia.org/wiki/Octree) with the added feature that triangles involved in collisions are remembered and checked first in subsequent collisions. The iterative nature of the simulation involves many collision checks and any reduction in processing can have a significant impact.

Figure 12:
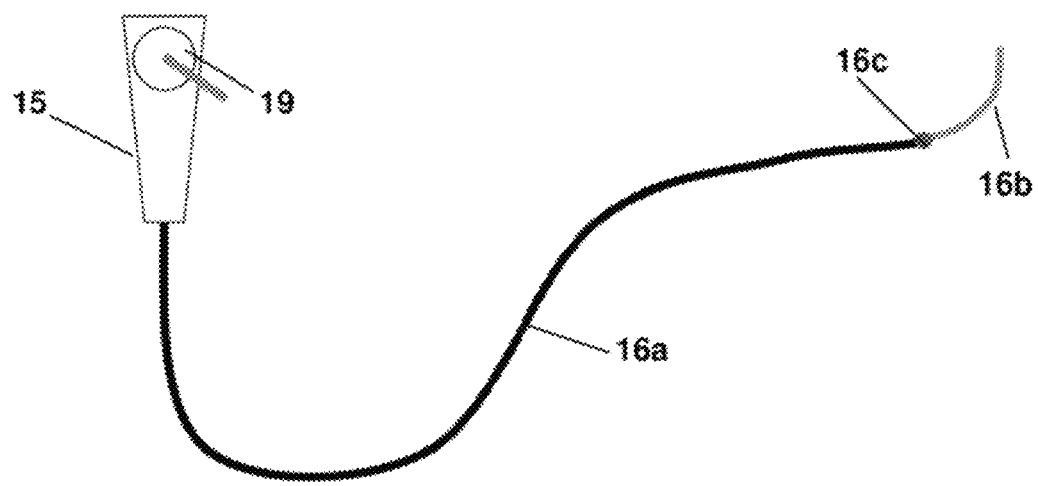
FIGS. 12 and 13 show a bent tube, the latter with an additional obstacle.

There are two parts to the simulated bronchoscope tube, as illustrated in FIG. 12, namely, tube body 16a and tip 16b. While the specifics may vary based on the equipment being simulated, generally, tube body 16a is a long (typically 600 mm) uncontrolled flexible tube (i.e., bendable in all directions with no internal means provided for controlling the bending) that connects the tip (i.e., the end of the tube) and the handset at neck 16c. The tip 16b is the far end of the tube where the camera lens and light source are located. The tip 16b is bendable in (preferably) one plane through operation of a lever on the handset, and is substantially rigid in every other plane. Note that according to preferred embodiments that use a mock endoscope, the tip is preferably not actively bendable, this is merely simulated in the virtual environment.

Due to the different properties of the body and tip, they preferably use different simulation techniques as described below.

In line with conventional endoscopes, a special characteristic of the body is that it is resistant to torque or twist. This means that roll rotation applied at the handset side translates through the tube to the tip without much loss. In other words, a 90 degree roll at the handset translates to a 90 degree roll at the tip.

In real life the tube slides through the model (i.e., patient) as more of the tube is fed into the entry hole. In the simulation, the body does not move, it is "grown" forwards by adding capsules at the tip, with the new segment adjusted in length to the same extent as the length of the tube fed into the model.

Preferably, the engine checks capsules from the tip backwards for collisions up to a limited number of capsules. In a real tube, it can be seen that a tube body moves less laterally further away from the tip. This fade out effect is used in the simulation.

When a collision is detected, the engine calculates the most appropriate escape direction for that segment, as described below. A small correction is applied to the angle between the colliding segment and the segment before that (Parent segment). These corrections are also applied to n segments further back where the correction is progressively smaller for each joint. This results in a gentle curved looking tube.

Figure 13:
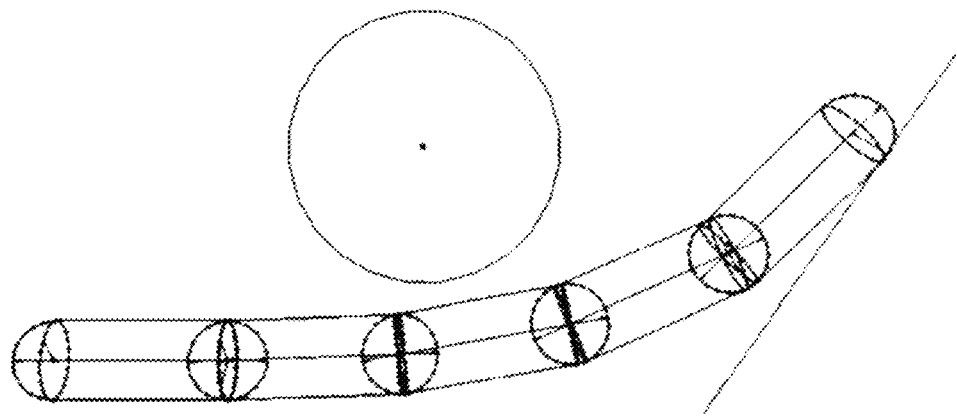

However, collision correction can cause new collisions anywhere on the tube as illustrated in FIG. 13 with the large circle being a potential collision point. Therefore the entire part of the tube that has moved is checked again for collisions and corrections made. This is a cycle that may run many times before the engine settles on the most appropriate angle. Once the loop has a resolution or when it has run for the maximum number of iterations, it passes the solution to the graphics engine.

The actual process is a bit more complicated. The iterator will try to resolve a collision by changing the various segment angles as described above but the tip is supposed to maintain its angle and so it cannot be bent out of the way in this manner. This is solved by providing at least one or more segments at the tip with a certain amount of "give" as described hereinabove. Each tip segment only has a small amount of "give" and therefore the tip forms a relatively rigid shape while a tube segment has more "give" and therefore can be deformed easily. The iterator distributes angle corrections along the tip area and into the tube area. Since the tip has less "give" most of the required angle correction will be applied in the tube area.

The amount of "give" required to resolve a jam of the endoscope in the passageway can also be used as an input for determining tip pressure. High tip pressure may in real situations result in patient injury/discomfort and this measure may be more revealing than simply counting the number of collisions.

The solution is passed to straightening logic once a correction has been created and no more collisions occur due to the correction. After all, the tube will have some tendency to straighten itself. The straightening logic goes through and reduces correction angles where possible as long as no collisions are created. Straightening happens from the tip backward.

Figure 14A:
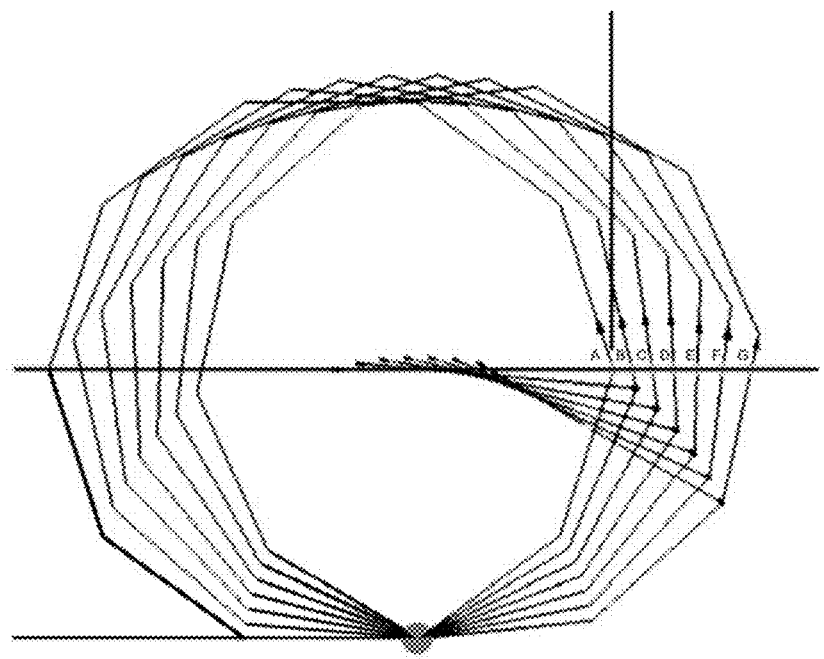
FIGS. 14a and 14b show angle distribution between segments.
Figure 14B:
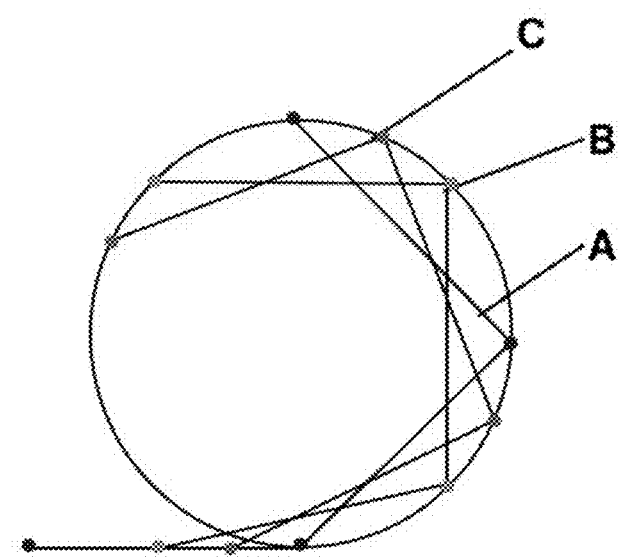

As mentioned previously, the tube body and tip have different behaviours. The tip is able to be controllably bent and maintain a particular curvature while the tube is not (at least directly) controlled by the user. However, because the tube is grown at the very tip it can be seen that a segment in the tip gradually moves toward the back and eventually becomes a tube segment. This is a problem because most of the time one segment is partly a tube and partly a tip. This makes the angle distribution between the segments vary continuously as illustrated in FIGS. 14a and 14b. Referring to FIG. 14b, the tube is simulated as track A, then B and then C as it is inserted.

The theory presented until now is a simplified version of what is really going on in 3D space. During a single simulation cycle there can be many collisions simultaneously along the length of the body. Typically these collisions occur roughly at one side of the tube thus leaving it a way out or escape to the other side. The left images in FIGS. 15a-d show segments being added and the right images show the corresponding view with the segments superimposed one above the other.

Figure 15A:
FIGS. 15a, 15b, 15c, and 15d schematically show how collisions are resolved.
Figure 15B:
Figure 15C:
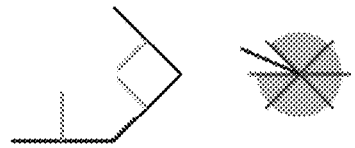

In the first case shown in FIG. 15a, as the body moves forward (away from you), the tube encounters a single collision. We need to know the escape direction which is indicated by the Blue line in each of the right hand images i.e., the line that bisects the white space. In the second case (FIG. 15b), there are two collisions. The body cannot rotate down and cannot rotate to the bottom right either. The escape direction is in the middle of the free circle segment.

Figure 15D:
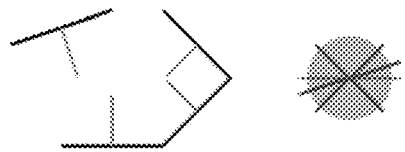

As collisions become more complex the escape directions become more limited and eventually no escape direction is possible as shown in FIG. 15d. In that case we consider the tube body to be "stuck". Normally at least 3 collisions are needed for this.

The invention uses mathematically accurate logic to determine when the tube will be in the "stuck" state. In this state, only the correct sequence and quantity of movement, roll and bend will get the simulated endoscope unstuck. This is very difficult to achieve and not a natural representation. In real life, the innards of a patient are not hard and solid but soft and pliable in places. In addition, the tube has, although little, some level of twist. The tube bend angle also has some "give" and is not absolutely rigid. Consequently, when the tip is commanded to bend to 45 degrees, external forces can cause it to vary somewhat.

Figure 16:
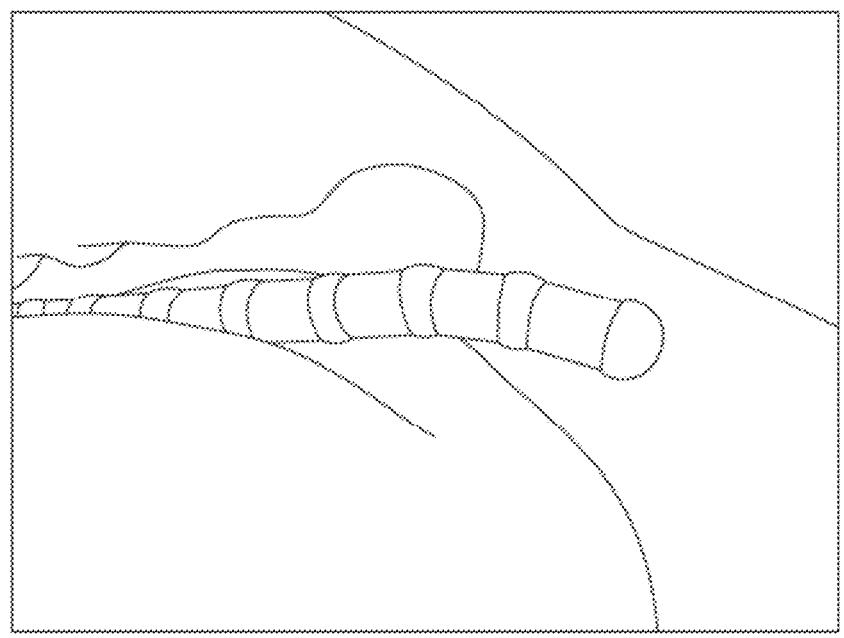
FIGS. 16 and 17 show the simulated endoscope with "give"
Figure 17:
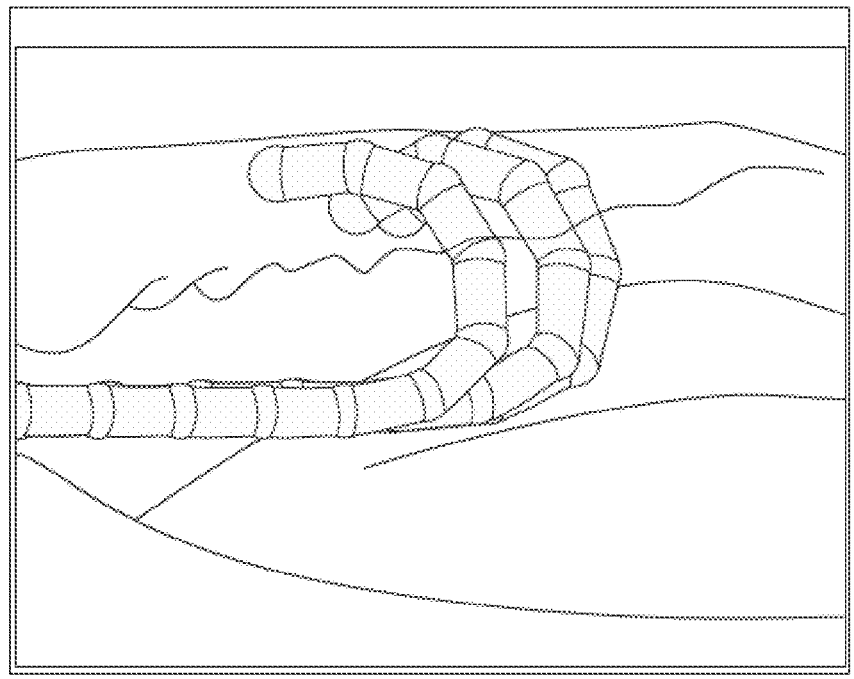

The simulation engine of the invention has "Give" logic built in for the tip only. This logic is only used when a "stuck" state is reached. At that point the "Give" logic attempts to modify the tip so that it reduces the number of collisions. In many cases this will resolve the stuck state allowing the tube to smoothly proceed. FIG. 16 shows "Give" in action with the tip bent and not straight as it should be.

The "Give" logic steps through the tip capsules from the neck joint 16c onwards. All capsules between the neck joint and the one with the collision will be rotated so the collision is resolved. The angle correction is distributed over the capsules to achieve a smooth curved looking tip. The "Give" dramatically improves insertion and withdrawal without the tube getting stuck. It also improves the natural look of the simulation.

According to one embodiment, the simulation software is written in Delphi and makes use of the open source GLScene OPENGL® library. According to a presently preferred embodiment, the software is written in C++ using the "Ogre" 3D graphics engine.

The invention may simply ensure that the simulated endoscope follows the correct path in a virtual passageway. However, force feedback to the operator during use of handset 15 may also be generated. For example, feedback forces may be provided in the event of any collisions. Any of a variety of widely available haptic means may be modified to provide the desired force feedback. Thus, motors, braking means, etc may be used to resist or impinge movement of tube 16. Means may be provided at the aperture or proximate thereto, including inside the housing. These means may inhibit, restrict or reverse rotational and/or translational movement of the tube. By effecting force feedback proximate to the aperture, the resulting feedback is more realistic as it is then generated as though it was originating from inside a patient. In its simplest form, the same level of force feedback could be provided in response to any collision of the tip with the walls of the virtual environment.

The invention preferably provides alternative perspectives for viewing the simulated procedures. A first view imitates that which would be seen through a conventional endoscope carrying out the procedure and preferably includes a round cut-out view with a marker identifying the top of the tube. A second view is a cross-sectional longitudinal view along the length of the relevant passageway which is useful for instructional and/or monitoring purposes as it provides a good visual representation of the path of the simulated endoscope. The invention preferably enables manipulation of the images, such as through rotation of the perspective or viewing angle and/or zoom. The viewing angles may not be limited to those seen through an endoscope. For example, users may be able to "explore" environments without the restrictions in movement imposed by an endoscope.

The software is preferably configured to be executable on conventional computers having sufficient processing power to determine the path of the endoscope and display images to the user, preferably in or approaching real-time. According to a presently preferred embodiment, the software is operated using a Windows-based application but the invention is not limited thereto. Those in the art will appreciate that other operating systems may be used. Use of conventional computers and systems enables deployment of the invention in a wide variety of environments without the need to transport heavy or bulky equipment. Since the environment and operating/processing software may be loaded into a computer such as via the internet or any computer readable disk or other media, the only additional equipment required is the handset 15, tube 16, housing 17 and any required connectors. Furthermore, while inclusion of housing 17 is preferred as it provides a means for holding tube 16 (and possibly other elements when not in use), it is not essential. For example, a ring or other support may be secured to an edge of a desk and define the aperture through which tube 16 is fed, the ring having sensors and able to transfer information to a computing device.

Figure 2:
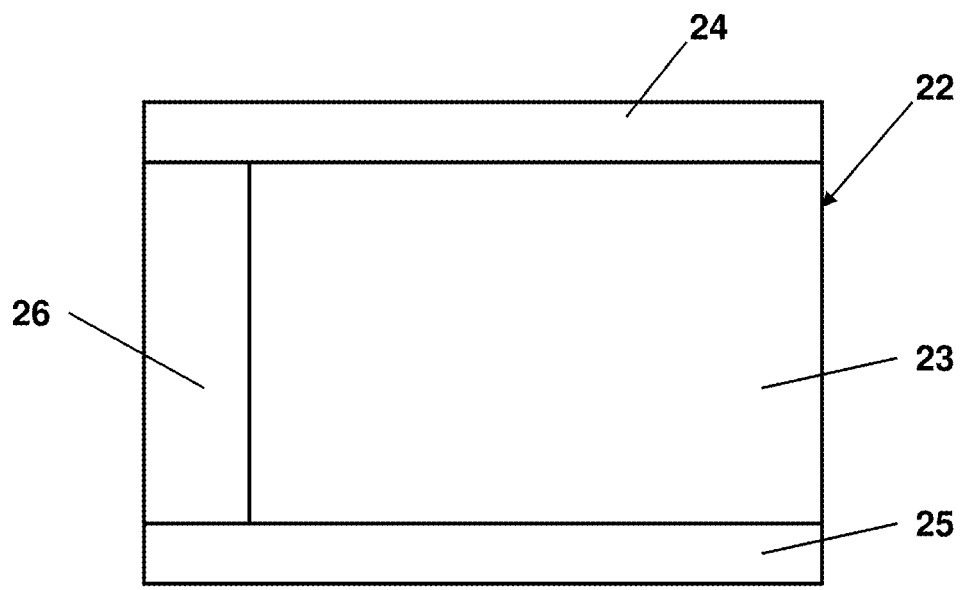
FIG. 2 is a schematic representation of a display layout.

A schematic screen layout 22 is provided in FIG. 2. Region 23 is the main viewing area which displays the simulated images. Depending on the state of operation, region 23 may display the first or second view described herein or some other view. As would be apparent, the first and second views may be selectively displayed side by side or each view may in turn be maximised to cover the full screen. Example images for the first and second views are provided in FIGS. 3 and 4.

Figure 5:
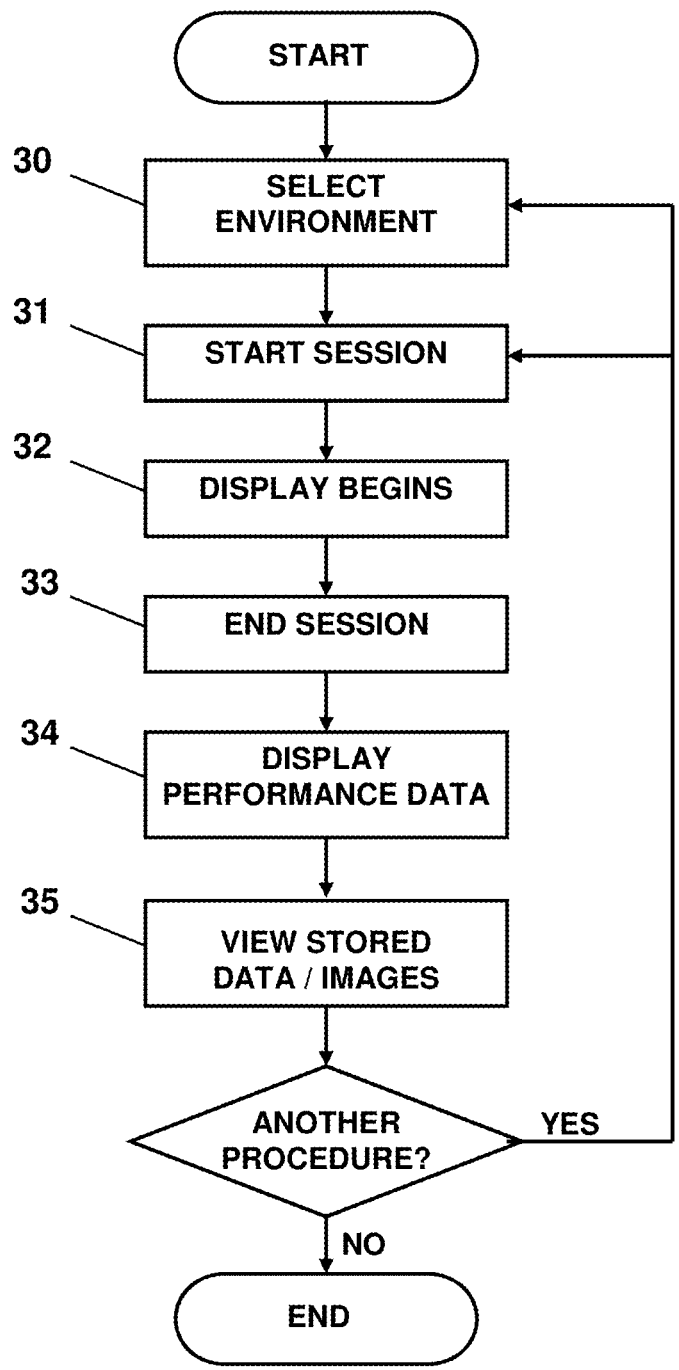
FIG. 5 is a flow diagram illustrating the steps of an embodiment of a method according to the invention.

Layout 22 also includes pull down menu 24, status area 25 and buttons and user feedback area 26. Further details of layout 22 will be described with reference to FIG. 5, which is a flow diagram illustrating the steps of a preferred method.

To initiate the system, a user may open a file using pull down menu 24, which enables a particular simulated environment to be selected at step 30. Settings for parameters of the simulated endoscope may be provided, such as tube diameter, tube rigidity, tip bend limits, camera field of view limits and tip light intensity. Default settings may be set for each environment, or a single set of default settings may be set for all environments. Also, on start up, a default environment (such as that for a bronchoscopy) may be loaded into the system. There is no limit to the number of environments which may be selected from. Thus, users may potentially perform any procedure they wish on any type of human or animal patient. For example, procedures may be practised on patients of various ages, states of health, etc.

According to one embodiment, patient data (such as that derived from scans) is used to generate the environment. This improves realism and the ability to simulate a wide variety of environments. A particular advantage of this embodiment is that the generated environment may be used to practise a particular procedure for a particular patient before conducting the real procedure on the actual patient. Particularly for more risky procedures and those performed less frequently, this has the potential to significantly improve results.

According to a presently preferred embodiment in which scanned data is used to generate the environment, standard images are used and displayed with the dimensions inside the environment varied based on the data from the scan. This addresses the issue that the appearance of a particular surface is not always derivable from scans. Example dimensional data may include the length/angles/diameters of the bronchi.

Opening of a new environment may automatically clear any user performance data stored in the system from previous simulations. Alternatively, the data may be stored for later retrieval. At step 31, after the selected environment has been loaded into the system (an indicator may be provided to the user in status area 25 to show that this has been completed), a user begins the session by inserting tube 16 into housing 17. Preferably, a sensor is provided at the opening to housing 17 to detect the presence of tube 16. This may be a dedicated sensor or make use of sensor 18. When the sensor detects the presence of tube 16, display of images in region 23 begins at step 32. As the user operates handset 15 and inserts tube 16 into housing 17, the moving images are displayed to the user as though the task was being performed by a conventional endoscope. The images, the path of the simulated endoscope and other parameters (described below) are stored during operation so as to enable the path to be subsequently viewed and/or assessed. After performing the desired tasks in the simulated environment, the user withdraws tube 16. Display 16 continues until a sensor at the opening of housing 17 detects that tube 16 is no longer present in the opening, at which point the session ends (step 33).

On ending the session, a performance summary may be displayed to the user at step 34. A reset button in area 26 may be used to reinitialise the system to step 30 or 31, as desired, so that the simulated procedure may be repeated or a different procedure performed. Commands in pull down menu 24 may additionally or alternatively be used.

At step 35, a user may select to view stored data from one or more previously performed procedures, again using buttons or icons in area 26 and/or commands in pull down menu 24. As desired, performance parameters and/or visual images (including the first and/or second views) may be displayed. Where the second, cross-sectional view is displayed, the paths of multiple attempts at the procedure may be simultaneously displayed so as to enable comparisons to be performed. According to one embodiment, an ideal path may be plotted on the image to enable presentation and measurement of the deviation therefrom.

Different users or types of users may have different access levels. For example, students or trainee practitioners may only be able to perform steps 31 to 34 while an observer may only be able to perform steps 30, 34 and 35 so that they are able to select the particular environment and/or procedure to be performed and then view the results. Determination of a user's access level may be made by requiring users to sign in with a login and/or password.

Preferably, prior to step 30 or 31, users may provide information regarding their identity to enable data to be associated with themselves.

In addition to recording the images displayed during operation of tube 16, other parameters which may be recorded include tip collisions, the length of time to fully insert tube 16, the length of time tube 16 is inside housing 17, the total tube distance traversed, the top speed of the tube, the number of times tube 16 is partially withdrawn and then reinserted (this may be measured by determining the total movement of the tip of tube 16 or may be a separate measure), the total tube angle traversal and the total tube direction changes. As well as counting collisions, a measure of the force of impact and the angle of incidence may also be recorded so as to identify occasions where there may have been a danger/discomfort to a patient in a real-life scenario. The tube "tension" as measured by the "give" (see above) may also be used in this regard. Details of parts of the passageway/organ walls etc may be included so that injuries to the patient may be simulated on the display. More preferred parameters and methodology for performance assessment are described below.

Figure 3A:
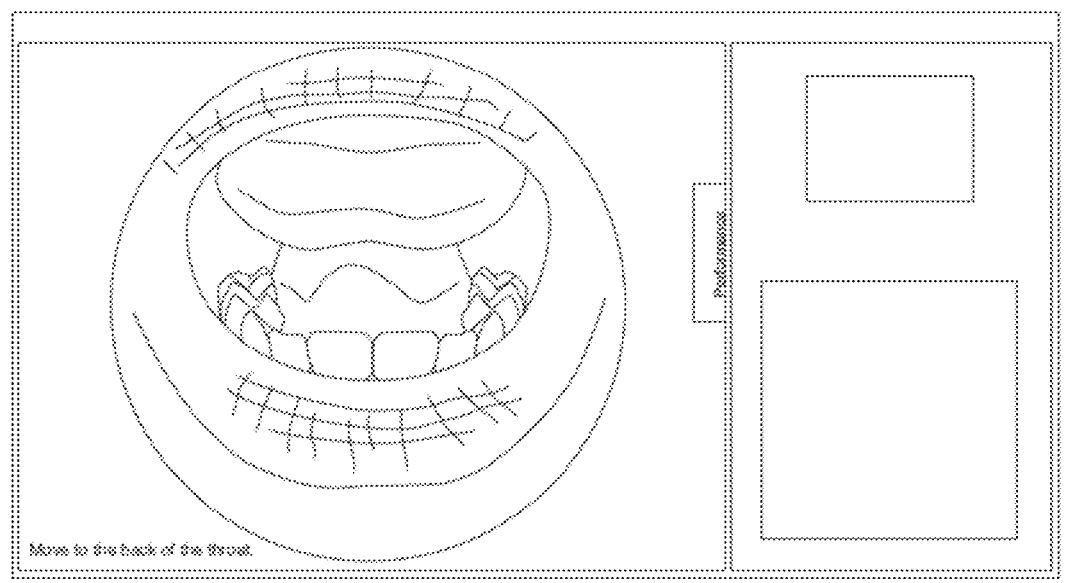
FIGS. 3a and 3b are example endoscopic images that may be generated/displayed.
Figure 3B:
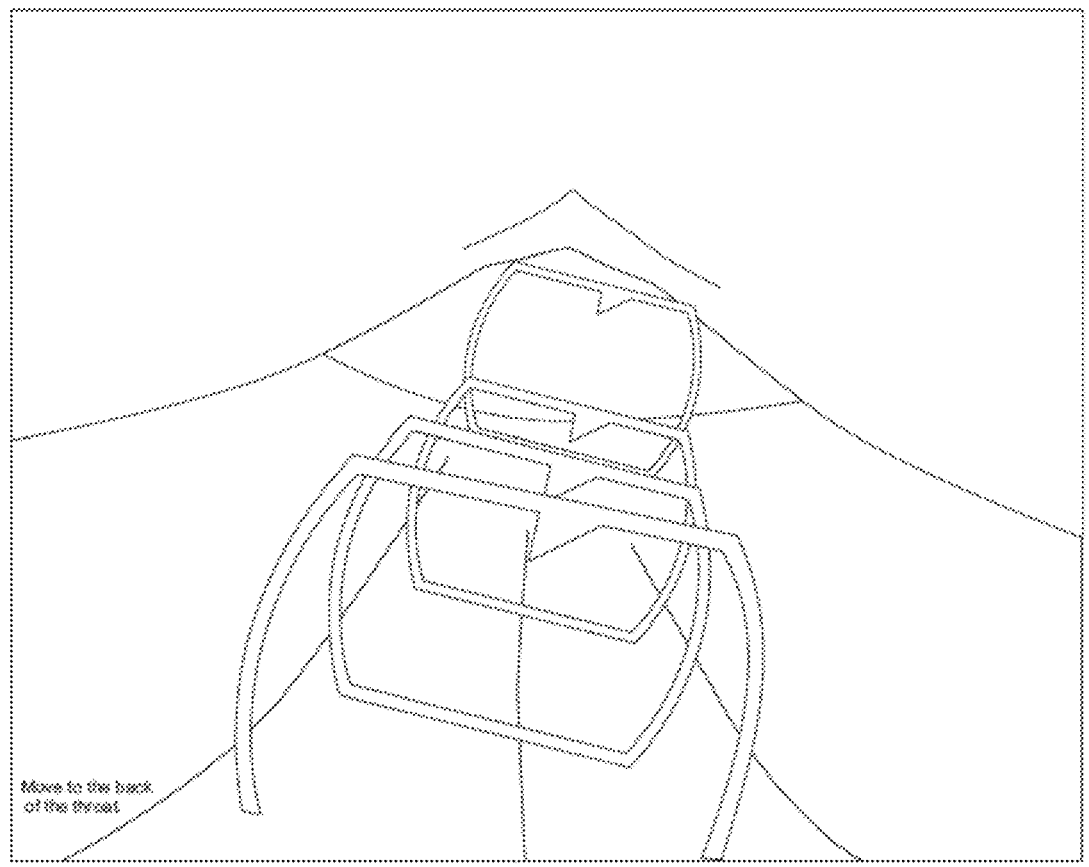
Figure 4:
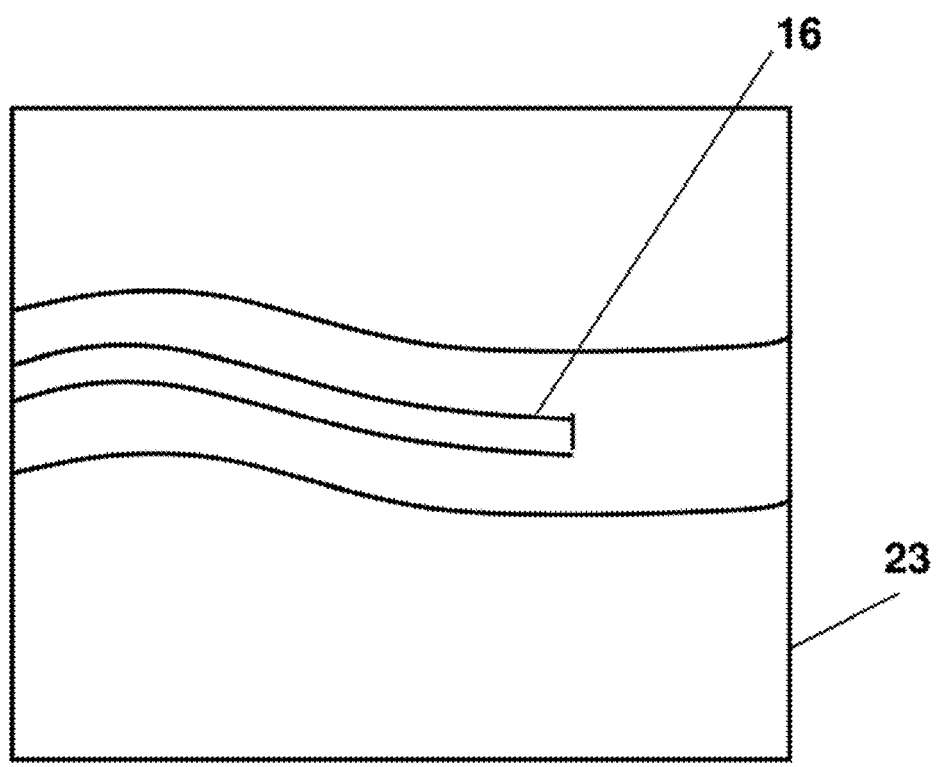
FIG. 4 is an example cross-sectional image generated/displayed.

FIGS. 3a and 3b show an alternative layout to that of FIG. 2. In FIG. 3, the base menu is provided on the right hand side of the screen (see FIG. 3b). On clicking one of the menu items, a tab appears (e.g. "Performance" in FIG. 3a). Instructions are preferably provided to users in the bottom left hand corner of the image, as shown. To ensure accurate movement and depiction thereof in the virtual environment, the aspect ratio of the image is preferably locked to prevent image distortion. The centre of the main viewing area is not always in the centre of the window and it is therefore necessary to apply off-centre 3D rendering to ensure that the 3D images remain optically correct. FIG. 3b also includes "guides" or "gates" which help to steer a user through the environment. This aspect is described further later.

Figure 6:
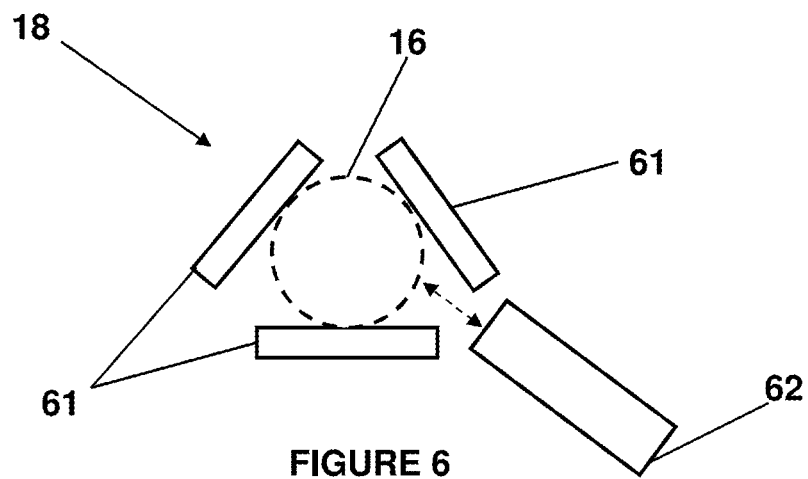
FIG. 6 is a schematic diagram of a sensor arrangement.

FIG. 6 shows a preferred arrangement for sensor 18, including guides 61 and detector 62. Guides 61 hold tube 16 a fixed distance from detector 62 so that detector 62 is able to detect movement of tube 16 and the extent of movement thereof. Guides 61 may be in the form of rollers, in which case force feedback may be effected by restricting rotation of the rollers. Force feedback may be additionally or alternatively effected by urging one or more of guides 61 against the surface of tube 16.

Detector 62 is preferably an optical movement detector but the invention is not limited thereto. A light emitting element such as an LED or more preferably a fine laser is projected onto the physical tube surface upon which an optical sensor is focused. Consecutive images from the optical sensor, preferably captured at a rate of 7000 pictures per second, are analysed to detect changes corresponding with movement of the tube. Displacement values corresponding to translational and rotational movement of the tube are calculated in real time by a digital signal processor (DSP), preferably at a rate of 120 times per second and transmitted to processor 12 via USB or any other suitable interface so that the movement is reflected in the simulated display. The sensed displacement resolution is preferably at least 2000 dpi or 0.0127 mm. As discussed above, optical cameras may additionally or alternatively be used.

Because the preferred detector 62 described above detects relative movement rather than the absolute position of the tube, errors may accumulate in use. It has been found these errors may vary depending on the direction of movement and it may be necessary to compensate using four separate calibration parameters, namely:

Total linear displacement=(FDP×FCF)−(BDP×BackwardCalibrationFactor), and

Total rotational displacement=(LDP×CCF)−(RDP×ACCF)

where FDP and BDP are the sum of forward and backward displacement measurements, respectively; FCF and BCF are forward and backward calibration factors, respectively; LDP and RDP are the sum of clockwise and anti-clockwise displacement measurements, respectively; and CCF and ACCF are clockwise and anti-clockwise calibration functions, respectively.

Figure 7:
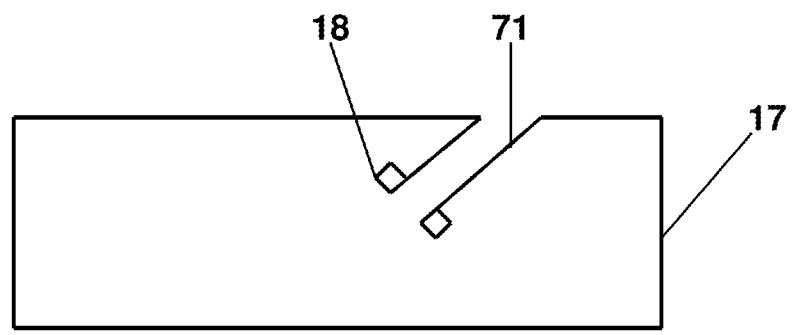
FIG. 7 is a schematic diagram of a housing according to one embodiment.
Figure 8:
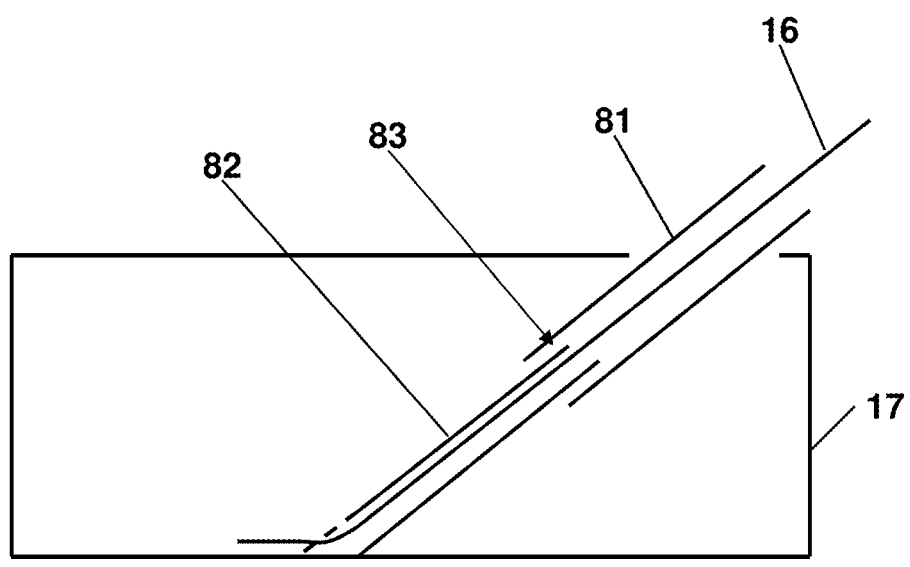
FIG. 8 is an alternative embodiment of a housing.

FIG. 7 shows selected features of a preferred arrangement of housing 17. In this arrangement, funnel 71 is provided to aid insertion of tube 16 into housing 17 and through sensor 18. The walls of funnel 71 may be configured to imitate the walls of the cavity or passage into which tube 16 is inserted. FIG. 8 shows an alternative arrangement. Only features particular to this arrangement are shown. It will be appreciated that other elements (e.g. circuit 21) are omitted from FIG. 8 for clarity.

The arrangement of FIG. 8 enables training in the insertion of, for example, an endotracheal tube into a virtual airway. Endotracheal tubes may be inserted into airways to ensure they remain open, particularly when a patient is under anaesthetic. Tube 81 is used as an endotracheal tube. Mounting 82 holds sensor 18 (not shown) proximate to region 83 so as to detect movement of tube 16. Mounting 82 may be coupled to the base of housing 17 or to the side walls of housing 17 (not shown) using one or more struts. Where the mounting is coupled to the base, a rigid tube may be used with an opening provided to enable the end of tube 16 to pass therethrough.

Sensor 18, or a separate, additional sensor, may be configured to monitor movement of endotracheal tube 81. Using simulated images obtained from tube 16, endotracheal tube 81 may be guided appropriately within the virtual environment during it's insertion. While not shown in FIG. 8, housing 17 preferably includes a funnel similar to that of FIG. 7. The funnel may be formed from a flexible material configured to simulate the feel of the passage into which endotracheal tube 81 is inserted.

Embodiments of the invention provide a preferably portable training device that can be set up wherever it is required, including in hospitals and medical schools, and that provides up-to-date, extensive and low cost training in the use of an endoscope. Thus, it is possible to practise insertion of an endoscope into a patient during which simulated visuals are displayed on a monitor or other display. The software of the invention may be used during the procedure to track a number of parameters, rate the user's performance and generate a performance report.

Definable Parameters

The Session Recording, Variance Testing and Real-Time User Instruction systems of the invention use several parameters which can be tuned to provide better results depending on the desired output and way the system is used. These are listed below along with example values. Their use is explained in more detail below. More, less or other parameters may be used and the values may be altered.

For example, a greater level of variance may be permitted to achieve a particular rating in a "novice mode" than when in an "expert mode".

| | |
|---|---|
| <min_recording_interval> | 200 ms |
| <comparison_interpolation_size> | 100 ms |
| <rotation_weighting> | 0.25 |
| <bend_weighting> | 0.25 |
| <user_leg_weighting> | 0.8 |
| <expert_leg_weighting> | 1.0 |
| <fifty_percent_score> | 10.0 |
| <min_future_variance> | 10.0 |
| <wrong_way_threshold> | 12.0 |

Session Recording & Playback

The recorded data is preferably small as it may have to be transmitted over the internet in real-time for remote assessment, and it preferably does not simply contain a recording of what the user "saw". For the purposes of variance testing, recording as a video file is unsuitable. Sessions need to be recorded in such a way as to play back the same each time on different speed machines. Given the non-deterministic nature of the engine and general differences in performance from system to system, recording just the user input is also unable to reproduce a given session.

Sessions are preferably recorded as a series of "nodes", each node containing information on the position and orientation of each segment of the simulated bronchoscope, as well as the rotation and bend angles, the time since the simulation started and the goal area which the head of the scope was in at the time (if any). Other data may additionally/alternatively be collected, depending in part on what is being simulated. In summary, a record is made of what "happened" i.e., movement of tube segments is recorded, along with changes of any user controls e.g. light actuation, focus adjustment etc, so that subsequent playback repeats the original simulation as accurately as possible.

After each frame of the simulation, a check is performed to see if <min_recording_interval> time has passed since the last recording node was created. If so, it adds another node containing updated information as at that frame. This means that recording nodes may be spaced differently depending on the speed of the machine running the application. Recording nodes are also created immediately before the scope is inserted and after it is removed, as well as immediately before and after entering and leaving a goal area. These non-uniformly-spaced recording nodes are a requirement given the application running environment and the need to reproduce the user experience as precisely as possible.

Recorded sessions can be serialized to a plain text file where one line constitutes a single recording node. While not essential, header information may be saved. A binary format for this file may be desirable. Recordings can be loaded back into the application from a file where the series of recording nodes is reproduced in the same form as it was saved out from.

The application recording logic provides a facility to interpolate a "fake" recording node which represents any specified duration since the start of the recording, and uses this information to provide smooth, continuous playback. For example, if playing back a recording and the timer indicates that 12.3 seconds have passed since starting to play, and there are only nodes recorded for 12.2 and 12.5 seconds, a fake node is created by interpolating information one third of the way between these two actual nodes. Interpolation for rotation, bend angle, and the position of the scope segments is done in a linear fashion, and tube segment orientation is "slerp'ed" ("spherical linear interpolation") between the nodes (also linear). Node times recorded preferably have a resolution of one millisecond.

Variance Testing

Given a recording made by an expert, the assessment module needs to be able to make meaningful comparisons between the expert and a user's progress over a period of time or at a single instant in time. Time cannot be used as a means for comparison as the expert and user will almost certainly progress through a given scenario at different rates. Lessons also need to be able to include branching goal trees, where a user can optionally perform one part of the lesson before another, so position-based comparisons between expert and user along a single linear path is also not a viable option.

According to preferred embodiments, "goals" are stored in a tree structure as part of a lesson. A goal is represented as a 3D area in space (usually a sphere) and the user is said to be at that goal when the tip of their bronchoscope is determined to be within the goal area. Other information such as descriptions and scoring values are also stored as part of a lesson for each goal. Goal hierarchies can either be linear, progressing from one goal to the next, or they can branch where the user may have multiple tasks to complete at each point and may complete them in any order, as shown in the example of FIG. 18.

Figure 18:
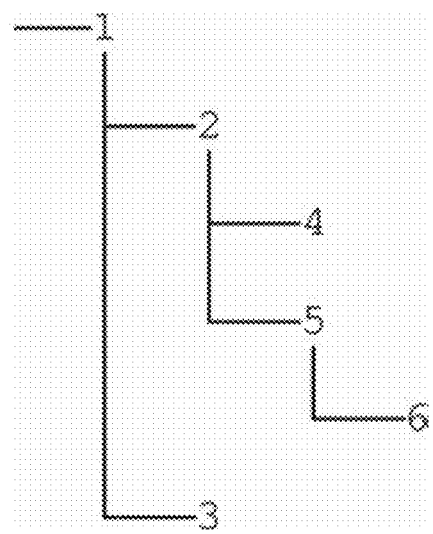
FIG. 18 schematically shows an example goal structure.

In the example of FIG. 18, the user must reach goal 1 first. After reaching goal 1 the user may proceed to goal 2 or 3 but must complete both at some point in the session. Goal 3 has no goals following it but goal 2 provides another choice and so on. Lessons may include "negative goals", which are not addressed by the variance testing system and which the user is penalized for achieving. Negative goals represent things such as touching a tumour, which should be avoided. In this structure the upper-level goals are referred to as "parent" goals for the goals nested directly below them, which are their "children".

Variance testing is done by comparing "legs" of the user's session against matching legs performed by the expert. For variance testing purposes, a leg is preferably defined as the recording from a parent goal to a child goal, where only the last node before the parent goal was exited is included and only the first node after the child goal was reached (along with all nodes in between). For a leg to be deemed valid for variance testing purposes, other goal areas may be moved through while travelling from the parent to the child goal, as long as these goals do not include either the parent or the child goals themselves. Recording legs are used in other places throughout the system but are not subject to the same restrictions.

This method of scoring legs of the user's session when individual goals are reached allows the system to provide scoring for parts of a task being completed in a non-predetermined order. This also allows the user to practice a selected leg multiple times within the same session and be rated for each attempt, if desired.

Due to the way legs of the journey are compared against an expert performing that same leg, there should only be one "correct" path between parent/child goal areas. If a user could take two different routes between goals and both were deemed "correct", the system would produce a good rating for only the one which the expert took when completing the scenario. Due to the branching nature of the airways this does not generally pose a problem although one case where care needs to be taken in placing a goal is at airway branches where the user has immediate child goals to complete in two or more directions.

Figures 19A, 19B:
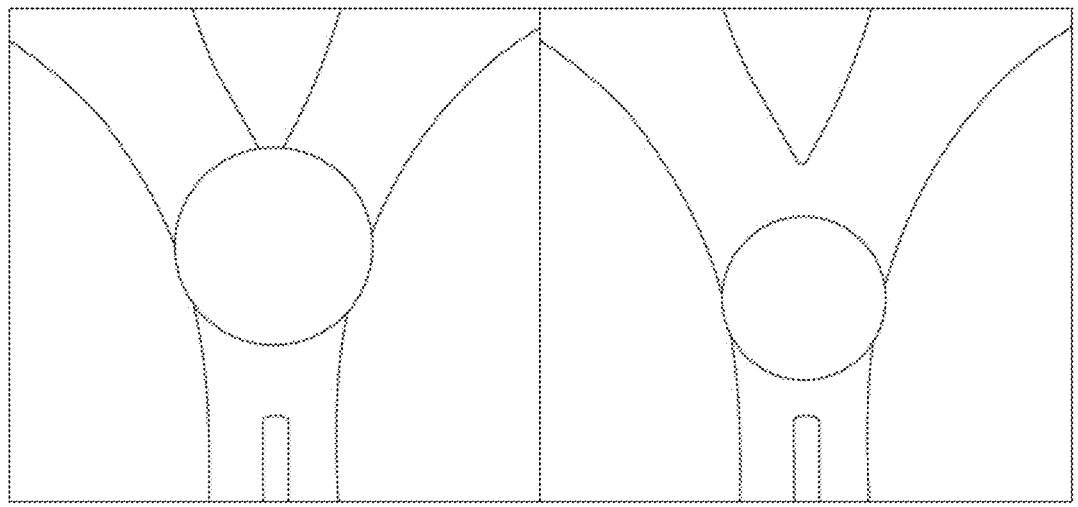
FIGS. 19a, 19b, and 19c show the positioning of goals.

In the example of FIGS. 19a and 19b, we assume that the user needs to complete child goals of the goal shown down both passageways. If the goal is placed so that it completely covers the entrance to both side passages (as shown in FIG. 19a) then the user must return to the parent goal after completing the child goal down one passageway before commencing the journey to the goal down the other passage. This way each leg is well defined and can easily be compared against the expert performing the same tasks. If the parent goal does not cover the entrance to both side passages (as shown in FIG. 19b), the user may pass through the parent goal and reach a goal up one passage, then come back to the intersection and begin up the other passage to the second goal without returning to the parent goal. In this case the leg of the user's journey to the second goal also includes going up another passageway and passing through the first goal. While the user has performed the tasks correctly both times, the goal placement in the second scenario means that at least one leg cannot be well defined and may give poor results.

For the purpose of defining legs of the journey, the "scope not inserted" state is considered a special-case parent goal, so the system is able to rate goals at the top of the goal hierarchy in the same way other goals are rated. The goal hierarchy should generally contain only one non-negative goal at its top-most level, as leaving the "scope not inserted" state is characteristically similar to approaching a fork in the airway which did not have a goal completely covering the way to child goals.

Figure 19C:
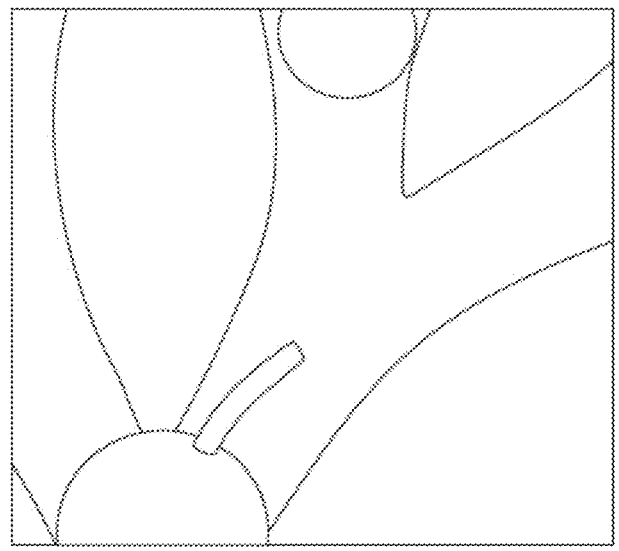

This restriction on goal placement does not mean that a goal needs to be placed at every branch in the airway. For example in FIG. 19c, a goal area has been placed well before a branch in the airway and the intention is for the user to continue up the left passage to the child goal (as no goals exist up the right-hand passage). The user may well look up the right-hand passage for their target goal and not find it, in which case this will be handled correctly by the variance scoring system and the user will receive a very poor score when compared against the expert. Goal areas may be invisible to the user (preferably at the lesson designer's option) so that no visual cue indicates the target goal is up the left passageway as shown in this image.

Each time the user reaches a new goal area, the system traverses back through the user's recording looking for a point where he or she was at the goal's parent goal. If the system finds another instance of being at the child goal before encountering the parent goal or if the beginning of the recording is reached without the parent goal being found, then the leg is deemed to be invalid for variance testing and is ignored. If the leg is valid, the system then finds the first instance of a matching valid leg in the expert recording and begins comparison.

Preferably, three attributes are measured when comparing expert and user data. These are: Position (in mm); Rotation (in degrees); and Bend angle (in degrees).

The "Position" measured here is the position of the point on the scope where the body of the scope meets the neck. This gives a constant reference independent of the scope being used and the most useful measure of where the user actually is within the airway, with the position of the neck being accounted for by the Rotation and Bend angle. The Rotation and Bend attributes are given a weighting (<rotation_weighting> and <bend_weighting> respectively) in comparison to Position, which has an implicit weighting of 1.0. These weightings can be tuned to place more or less importance on specific attributes when comparisons are made. For example, giving Rotation a weighting of 1.0 would imply that a difference in Rotation of 1° was as important as a difference in Position of 1 mm for the purposes of rating the user's performance; whereas a weighting of 0.2 would indicate that 5° was equivalent to 1 mm in terms of importance.

Comparison between a matching user and an expert leg starts by first taking a single recorded node in the user's leg and comparing it to each node in the expert's leg. Comparison between nodes is preferably done by measuring the difference in Position, Rotation, and Bend angle, multiplying them by their respective weighting values and adding the three results together. This result is referred to as their "score", where lower scores indicate the nodes are more similar and a zero score indicates they are identical (i.e., have no variance). Once the closest matching expert node is found for a particular user node, the system interpolates in steps of <comparison_interpolation_size> milliseconds between the expert node and the nodes immediately before and after it, and searches for an even closer match. By using a constant defined size for interpolation, the accuracy of the comparison is improved but more importantly the non-constant duration between recorded nodes (due to differences in performance from system to system) will not influence the average variance between compared results, because at this lowest level of comparison the step size is the same for all systems. Consequently, comparison_interpolation_size> should be half of <min_recording_interval> or less.

After finding the closest matching interpolated expert node for the given user node, the system then calculates how many "units of variance" there are between the previous user node and this one, where this variance is calculated with weighted Position, Rotation, and Bend angle as above. This FIG. 1s then used to weight the score produced by the comparison with the expert done above. In this way, if the user moved forward 5 mm with a variance score of 2, then 3 mm with a variance of 1, a total of 13 units of variance would be recorded over the 8 mm trip. It should be kept in mind that Rotation and Bend angle contribute to variance as well, so bending up by a number of degrees with a variance score of 4 may contribute the same to the total score as moving forward by a number of millimetres with the same variance score. In this way a user holding their scope at a constant insertion distance but bending or rotating the scope can have their movements compared to the expert and weighted in a meaningful manner.

After finding the variance for a specific user node and weighting that variance appropriately, the process is repeated for all other user nodes and the resulting total is recorded. This total score is divided by the sum of the variances between neighbouring user nodes over the leg, effectively giving the "average variance per millimetre", except that Rotation and Bend are also accounted for in distance travelled, giving a far more representative result for the leg.

This total average score represents how closely all the points in the user's recorded leg matched with individual points along the expert's leg, but if the expert did something which the user did not, this will not be represented. For example, consider the situation where an expert moves forward half way along a route, then bends their scope up to have a closer look at a tumour (as required by the lesson), then bends their scope back down and continues along the route to the end, while the user simply moves forward from one end of the route to the other. In this example, each point along the user's leg will match very closely with at least one point in the expert's leg, and the total variance score will show that the user did very well, even though they missed out a crucial part of the lesson. To handle this situation, the entire comparison process is done a second time except that this time the expert's leg is compared to the user's leg (rather than the other way around), effectively giving a result showing how closely the expert followed the user, and thus capturing any situations where differences occurred.

Taking these two variance totals, one for the user following the expert and one for the expert following the user, they are then weighted by <user_leg_weighting> and <expert_leg_weighting> respectively, added together and divided by <user_leg_weighting>+<expert_leg_weighting>. These weighting values let more importance be placed on things one failed to do than things the other failed to do, for example a <user_leg_weighting> of 0.5 and an <expert_leg_weighting> of 1.0 would mean that the user is penalized half as much for moving along a route, looking left when they were not supposed to, then continuing on to the end, than if they moved along the same leg and failed to look left when they were supposed to.

The final score will be low if the user did well or high if they did poorly, and will be within a similar range regardless of the length or complexity of the leg being measured. This score is turned into a percentage, where percentages in the high 90's represent near-perfect runs and lower percentages represent not so perfect runs, by applying the formulae:

$$\text{percentage}=1.0/(\text{score}+<\text{fifty\_percent\_score}>)*<\text{fifty\_percent\_score}>*100.0$$

Figure 20:
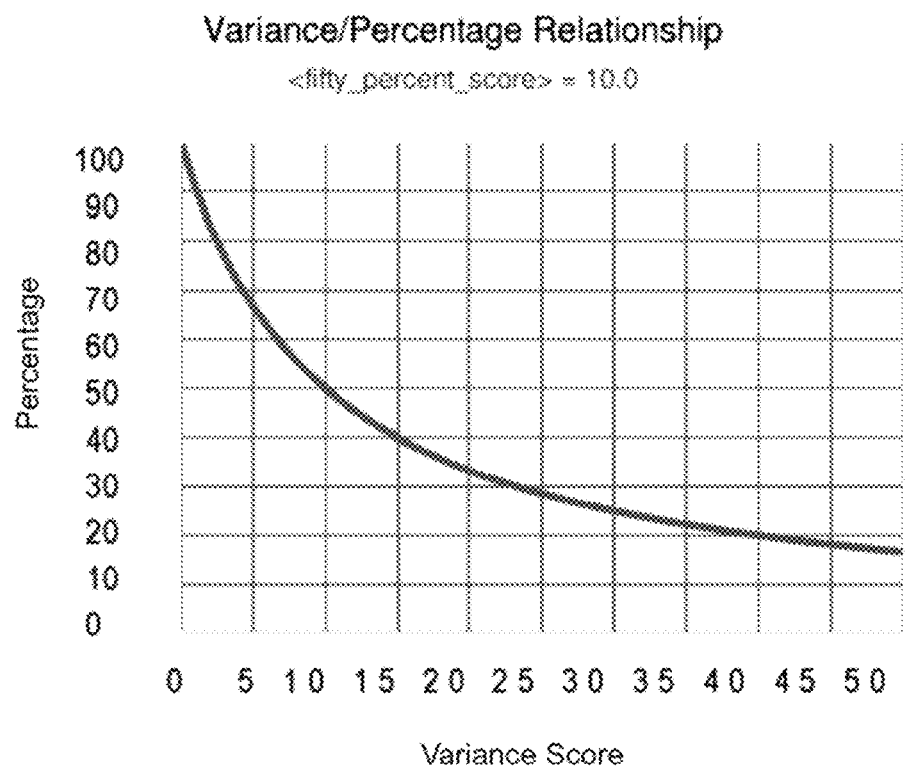
FIG. 20 charts user variance against percentage score.

In this way the value of <fifty_percent_score> can be selected to be a reasonable variance score which a user should receive a mark of 50% for. Higher (worse) variance scores will be awarded marks approaching 0%, while lower variance scores will be awarded marks closer to 100%. Even though a score of zero will receive a 100% score, it is virtually impossible to achieve this perfect reproduction of what the expert did. Matching percentages for variance scores from 0-50 are shown in FIG. 20 was plotted using a <fifty_percent_score> of 10.0.

Each goal defined in a lesson file also includes a number of points that the goal is worth, based on the relative difficulty or importance of achieving that goal in the lesson. To calculate how well a user has done over the course of a lesson, the percentage the user achieved for each goal can be multiplied by its point value to give a number of points the user is awarded per goal, then a total mark out of a possible maximum for that lesson can be derived at the conclusion of the lesson.

Negative goals, (goals which the user should try not to achieve) have negative scores. Each one of these gives the user a negative number of points when the goal area is entered. The route to a negative goal is not tested by the variance system and the user always receives the full number of negative points if one of these goals is hit.

Figure 21A:
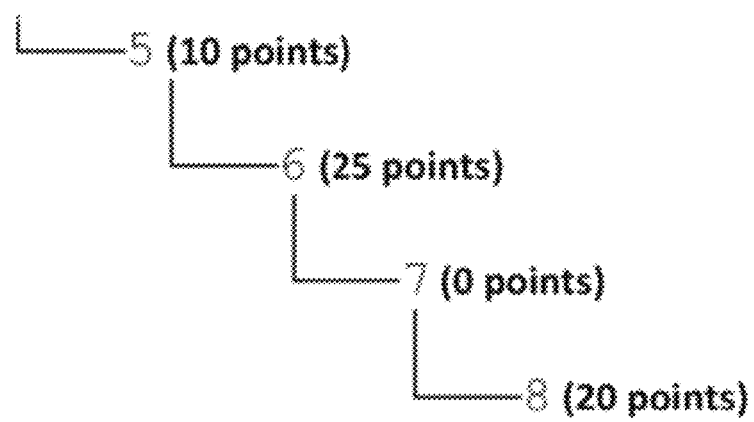
FIGS. 21a and 21b show an example goal hierarchy and corresponding goal layout.
Figure 21B:
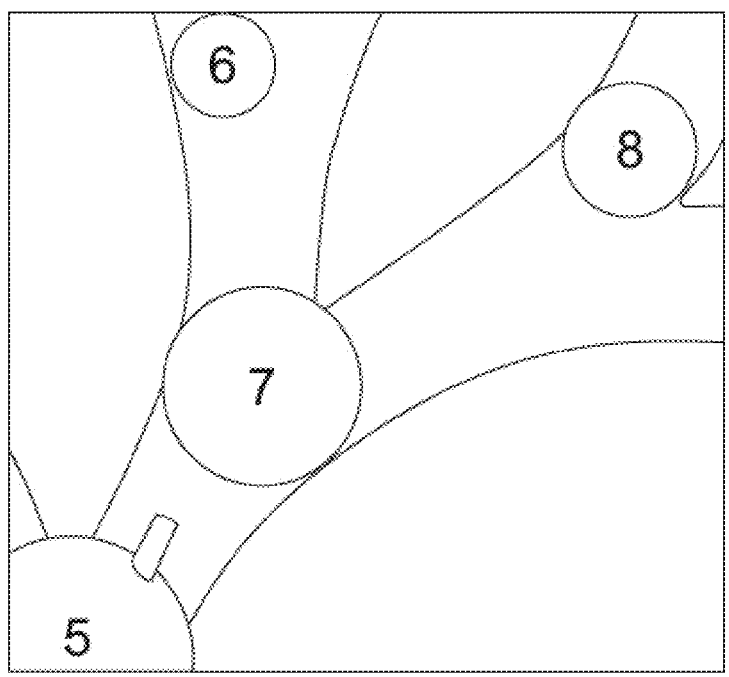

Some non-negative goals may not be tested by the variance system, as although they need to be achieved as part of the lesson, it is not appropriate to award a score for them. For example, consider the goal hierarchy from a lesson file presented in FIG. 21*a* and how it relates to the goal layout of FIG. 21*b*.

In this lesson, the user must travel from goal 5 to goal 6, then withdraw the scope back to goal 7 before continuing on to goal 8. As the leg of the journey from goal 6 to 7 is simply withdrawing the scope, the lesson dictates there is no need to mark for it and hence arriving at goal 7 is ignored by the variance testing system.

Real-Time User Instruction

Along with making variance comparisons over legs of the user's session, the system can also produce a variance score for a given instant in time. This is done using the same method as above for determining the variance of a single user recording node, except the score is not weighted based on the time the node applies to (because it does not reflect a span of time) and a comparison of the expert-to-user is not made in addition to the initial comparison of user-to-expert. This produces a variance score for a single node which is in the same range as the average variance score produced for a leg.

When comparisons are made, along with returning a final variance score, the system can provide the Position, Rotation, and Bend angle offsets which apply to the specific node-to-node comparison which lead to the resulting score, and thus the application is able to determine what specific actions the user needs to perform to more closely resemble the expert.

Instructing the user on how to more closely resemble the expert at his or her current instant in time is not useful in terms of ongoing instruction, as it will tell the user what to do to be more like the expert "right now", but once they achieve this there is no instruction on how to proceed. For this reason we need to determine a point in time in future along the expert's path, and instead instruct the user on how to achieve that position, in an ongoing fashion.

The point in the future we aim for along the expert's path cannot be defined as a number of seconds from the current point, as if the expert paused for more than that number of seconds when making the recording the user will be instructed to stay exactly where they are and never get to a later position along the path. The point can likewise not be defined as a certain number of millimetres from the current position, as if the expert stopped moving the scope and instead rotated it or bent the neck, instruction on completing that action would be completely missed. This is solved by instead looking for a future point along the expert path with at least a certain amount of variance from the expert node being examined. This <min_future_variance> value can be adjusted based on what granularity of instruction and "hand-holding" we wish to provide to the user.

To provide on-screen instructions to the user, the application gives the variance testing system a recording node representing the user's current state, and asks it to locate the closest matching expert node for the current leg. Once this matching expert node is found, the application finds a future node on the expert's path which varies from this first node by at least <min_future_variance>. We then compare the user's current position to the future expert node and examine the three Position, Rotation and Bend angle factors which contribute to this variance.

The factors contributing to the variance between the user's current position and the future expert node can be displayed on screen as written instructions, icons which may fade or change color, or some three dimensional representation. The general instructions which are of use to the user are: Move Forward/Backward; Rotate Left/Right; and Bend Up/Down.

To determine if the user should move forwards or backwards, the system must first determine the positional offset in relation to the scene, and then consider whether this is in a "forwards" or "backwards" direction with respect to the current direction of the last portion of the scope before the neck. Other values detailing how far up, down, left or right the user should move within the airway can also be derived (and are used elsewhere), but provide no practical guidance for the user as they have very little control of where they lie within the airway with respect to these axes. A user who has moved through the airway in a similar manner to the expert will naturally lie in a similar position within the airway to the expert at that same point.

It should be noted that although precise instructions can be given to the user to help them perform the same actions as the expert, because these instructions tell the user how to get to a future point rather than perfect where they are at the moment, novice users following instructions continuously can only expect a moderately high percentage rating from the variance system. A practiced user should be able to pre-empt any instructions and perform similar actions to the expert at their current stage in the simulation, rather than constantly aiming for what the expert did next, and thereby achieve a higher rating.

The system is able to infer whether the user is completely off-track and progressing down the wrong airway passage by using the derived up/down/left/right offset information mentioned above. If a user is heading down the wrong passage they may have the correct Rotation and Bend angle to get where they're going, and may even match the expert well in terms of the forward/backward position, but in this case the up/down/left/right offset will be significantly off, and as such the system can instruct the user to simply "Move Back" until they get closer to their intended course before progressing forward up the correct passageway. The offset threshold where the user is considered to be in the wrong passage can be defined using the <wrong_way_threshold> value on a lesson-by-lesson basis and should be roughly the width of an airway passage in the lesson.

When the user is almost at the goal position they are being instructed to reach, they may have the correct Rotation and Bend angle, and their forward/backward direction may need so little adjustment to reach the goal as to not be mentioned by the instruction system (depending on how they are provided). When this is the case and there are no instructions to provide to the user, but they have yet to reach their goal, the forward/backward direction instruction is displayed no matter how small the offset in this direction, so that the leg is completed.

When the user enters the goal area of a parent goal with multiple children, it is unclear which child goal the user will try to reach next until the user exits the goal area in the direction of one of those children. For this reason, no meaningful instructions can be given to the user within a branching parent goal area, although instructions are possible within a goal with only one child.

According to an alternative, presently preferred embodiment, 3D gates are used to steer a user through the virtual environment, as shown in FIG. 3b. Preferably, each gate is centred around a point in the path of an expert user but may simply be positioned substantially in the middle of the passage at points therealong. Note that points (as opposed to the gates shown in FIG. 3b) may be used to guide users along a preferred path.

Embodiments may provide animation of the environment and/or of endoscope actions. For example, walls may pulsate or otherwise move and/or a series of actions may result in a user actuating a control on the endoscope (e.g. fluid may be removed, a tool may come in to view etc). Animation may also be provided in the event of tube impact with a wall, for example, to simulate a puncture wound. According to a presently preferred embodiment, the animation merely provides eye appeal and does not affect the actual position of items within the virtual environment. This reduces processing requirements. Alternatively, the model of the environment may vary as animation is played. As will be appreciated, movement of walls of the environment complicates the edge/collision detection process but still operates in essentially the same manner. Examples of animation include the beating of the heart and swallowing.

The invention may be applied to a wide variety of endoscopic procedures such as, but not limited to, bronchoscopy, gastroscopy, colonoscopy, nasopharyngoscopy, arthroscopy, laparoscopy, thoracoscopy and endoscopic sinus surgery. It may be applied to both rigid and flexible endoscopic procedures in humans and other animals.

While embodiments have been described including handset 15, tube 16 and housing 17, the invention is not limited thereto. These features provide for improved realism for a user but may be omitted in favour of more conventional input devices for computers (e.g. a keyboard, mouse etc). While such embodiments are not preferred, they can still be helpful, particularly in early stages of training, providing a user with a better feel for movement of an endoscope and familiarisation with internal environments, better enabling a user to navigate/identify anatomy. Realisation may be partly improved by configuring the input device in the form of a conventional endoscope controller.

Furthermore, while aspects of the invention have been described with reference to simulation of the use of an endoscope, it will be apparent that the invention may be applied to other types of simulated environments, including non-anatomical environments, and it is intended that such alternatives be included within the scope of the invention. In particular, the use of a simulation engine with a model of an environment and appropriate input devices may enable the invention to be applied more widely, not simply for viewing inside cavities. Example applications may include navigation through virtual caves, cities and roadways, flight paths and jungles. The environments may be modelled on real life environments but the invention is not limited thereto. Depending on the chosen environment, the input device(s) may be selected to imitate devices typically used by people operating in the environment. However, more conventional computer input devices may again be used to avoid the need for purpose-built equipment. The invention may also be applied in the computer gaming industry.

While housing 17 may be of a simple, box-like configuration, the invention is not limited thereto. At least the opening of housing 17 may be configured to imitate the relevant portion of a patient and the invention does not preclude the use of mannequins which further imitate the internal environment of a patient. Appendages may be couplable to the opening to enable the configuration of the opening to be varied depending on the environment being simulated. Such an appendage may, for example, be in the form of a mouth.

Any discussion of prior art is not to be considered as an admission that such prior art is widely known or forms part of the common general knowledge.

Various changes and modifications to the presently preferred embodiments described herein will be apparent to those skilled in the art. Such changes and modifications may be made without departing from the spirit and scope of the present invention and without diminishing its attendant advantages. It is therefore, intended that such changes and modifications be included within the present invention.

The embodiments of the invention in which an exclusive property or privilege is claimed are defined as follows:

1. A method of simulating the path of an endoscope in a human or animal passageway or cavity to assess the performance of a user manipulating an object in a virtual environment having at least one preferred path, wherein the object is configured to move inside the passageway or cavity and include a body portion and a tip portion having at least one segment, comprising:
   positioning at least first and second goals in the virtual environment, the goals each being defined by a point or space within the virtual environment and configured to be activated when the object enters said points or spaces;
   establishing at least one sequence in which to complete the goals;
   determining the position and/or orientation of only the tip portion wherein the movement of the object is translated into growing forward in the virtual environment by extending the length of the at least one segment at the tip portion, or reducing backwards by decreasing the length of the at least one segment at the tip portion within the virtual environment to determine a user's path; and
   comparing the user's path to the at least one preferred path,
   wherein the preferred path is established by an expert user guiding the object through the virtual environment.

2. The method of claim 1, wherein the object is an endoscope and the virtual environment represents a portion of patient.

3. The method of claim 1, wherein the first and second goals are positioned to provide at least one path segment and the step of comparing is performed for each path segment.

4. The method of claim 3, wherein the at least one sequence is established by arranging the at least one path segment into the form of a decision tree.

5. The method of claim 4, wherein comparing is performed to obtain a measure of variance of the user's path from the at least one preferred path.

6. The method of claim 5, including assessing the performance of the user manipulating the object.

7. The method as claimed in claim 6, wherein a haptic means may be modified to provide the desired force feedback to the user.

8. An engine for simulating the path of an endoscope in a human or animal passageway or cavity, the engine comprising:
   a memory storing encoded instructions;
   a processor; and
   a display;
   wherein the encoded instructions, when executed by the processor, performs a method comprising:
   representing an object in a virtual environment as a plurality of segments, the object having at least one body segment and a tip segment;
   determining a position and/or orientation of only the tip segment of the object;
   receiving input signals, said input signals based at least in part on commands of a user indicative of a desired motion of the object; and
   determining a movement of said object in the virtual environment in response to the input signals, said determining including:
     detecting whether the tip segment impacts a wall of the virtual environment; and
     if so, determining a direction of motion of a said tip segment following the impact by combining data representing each wall being impacted and resolving to determine an escape direction for the segment,
   wherein said movement of the object is translated into the addition or subtraction of the tip segment thereof to determine a user's path, and
   assessing the performance of a user manipulating the object in the virtual environment by comparing a measure of variance of the user's path from one or more preferred paths through the virtual environment.

9. A system for simulating the path of an endoscope in a human or animal passageway or cavity and/or for assessing the performance of a user manipulating the object in the virtual environment, the system including:
   the engine of claim 8; and
   the memory having stored therein data defining the virtual environment.

10. The system of claim 9, including:
    a mock endoscope including a tube; and
    sensor(s) for sensing movement of the tube,
    wherein the engine or a processor communicatively coupled thereto is configured to translate movement of the tube detected by the sensor(s) into movement inside the virtual environment.

11. The system as claimed in claim 10, including the display to display images of the virtual environment.

12. The system of claim 11, wherein the engine is configured to generate the images based on a combination of the data defining the virtual environment and the determined movement such that the images change at least partly dependent on movement of the object.

13. The system of claim 12, including actuator(s) for simulated control of the object.

14. The system of claim 13, including a memory for storing the simulated path and/or the inputs of a user and/or a record of the position of the object so that the images may be regenerated at a subsequent time.

15. The system of claim 14, including a processor for determining parameter(s) associated with movement of the object in the simulated environment.

16. The system of claim 15, wherein said parameter(s) include any one or more of:
    a speed of movement;
    a speed immediately prior to a collision;
    a length of time to insert and/or remove the object; and
    information generated by the engine regarding collisions.

17. The system of claim 16, including a processor for using the parameter(s) to measure a competency of operation by a user.

* * * * *